(12) United States Patent
Gupta et al.

(10) Patent No.: US 12,739,533 B2
(45) Date of Patent: Sep. 15, 2026

(54) SYSTEMS, METHODS, AND MEDIA FOR SINGLE-PHOTON IMAGING WITH IMPROVED ENERGY EFFICIENCY

(71) Applicants: Wisconsin Alumni Research Foundation, Madison, WI (US); Portland State University, Portland, OR (US)

(72) Inventors: Mohit Gupta, Madison, WI (US); Lucas Koerner, Saint Paul, MN (US); Atul Ingle, Milwaukie, OR (US)

(73) Assignees: Wisconsin Alumni Research Foundation, Madison, WI (US); Portland State University, Portland, OR (US)

( * ) Notice: Subject to any disclaimer, the term of this patent is extended or adjusted under 35 U.S.C. 154(b) by 98 days.

(21) Appl. No.: 18/629,592

(22) Filed: Apr. 8, 2024

(65) Prior Publication Data

US 2025/0317665 A1 Oct. 9, 2025

(51) Int. Cl.
*H04N 25/77* (2023.01)
*H04N 23/71* (2023.01)
(Continued)

(52) U.S. Cl.
CPC ............. *H04N 25/77* (2023.01); *H04N 25/53* (2023.01)

(58) Field of Classification Search
CPC ........ H04N 25/53; H04N 25/77; H04N 23/71; H04N 23/73; H04N 23/743; H04N 25/47;
(Continued)

(56) References Cited

U.S. PATENT DOCUMENTS 10,616,512 B2 4/2020 Ingle et al.
2018/0270405 A1 9/2018 Ota
(Continued)

FOREIGN PATENT DOCUMENTS

WO 2022177707 5/2022

OTHER PUBLICATIONS

Y. Ota et al., A 0.37W 143dB-Dynamic-Range 1Mpixel Backside-Illuminated Charge-Focusing SPAD Image Sensor with Pixel-Wise Exposure Control and Adaptive Clocked Recharging, in 2022 IEEE International Solid-State Circuits Conference (ISSCC), Feb. 2022, pp. 94-96.

(Continued)

*Primary Examiner* — Marly S Camargo
(74) *Attorney, Agent, or Firm* — Andrus Intellectual Property Law, LLP

(57) ABSTRACT

In accordance with some embodiments, systems, methods and media for single-photon imaging with improved energy efficiency are provided. In some embodiments, the system comprises: an image sensor comprising pixels comprising detectors in an array, configured to: generate image data representing a scene, and comprising pixel values based on a signal generated by the respective detector during a first period of time; and a processor configured to: determine, for each pixel, an inhibition value based on the pixel value; determine, based on the inhibition value, that a pixel is to be inhibited during a second period of time; inhibit the pixel such that a pixel value associated with the pixel in second image data is consistent with the pixel being inhibited during a second period of time.

20 Claims, 14 Drawing Sheets

(51) Int. Cl.

| | |
|---|---|
| ***H04N 23/743*** | (2023.01) |
| ***H04N 25/47*** | (2023.01) |
| ***H04N 25/53*** | (2023.01) |
| ***H04N 25/707*** | (2023.01) |
| ***H04N 25/773*** | (2023.01) |
| ***H10F 30/225*** | (2025.01) |

(58) Field of Classification Search

CPC .. H04N 25/773; H04N 25/707; H04N 25/589; H10F 30/225; H10F 77/959

See application file for complete search history.

(56) References Cited

U.S. PATENT DOCUMENTS

| | | | | |
|---|---|---|---|---|
| 2020/0036918 | A1* | 1/2020 | Ingle | H10F 39/8053 |
| 2020/0158837 | A1 | 5/2020 | Sharma et al. | |
| 2022/0272286 | A1* | 8/2022 | Price | H04N 25/58 |
| 2022/0329722 | A1 | 10/2022 | Price et al. | |
| 2022/0358346 | A1 | 11/2022 | Gupta et al. | |
| 2022/0382056 | A1 | 12/2022 | Price et al. | |
| 2025/0044093 | A1* | 2/2025 | Genevrier | G06T 7/521 |

OTHER PUBLICATIONS

T. Takatsuka et al., A 3.36 μm-pitch SPAD photon-counting image sensor using clustered multi-cycle clocked recharging technique with intermediate most-significant-bit readout, in 2023 IEEE Symposium on VLSI Technology and Circuits (VLSI Technology and Circuits), Jun. 2023, pp. 1-2.

J. Ogi et al., A 250fps 124dB Dynamic-Range SPAD Image Sensor Stacked with Pixel-Parallel Photon Counter Employing Sub-Frame Extrapolating Architecture for Motion Artifact Suppression, in 2021 IEEE International Solid- State Circuits Conference (ISSCC), Feb. 2021, pp. 113-115.

R. K. Henderson et al., 256 × 256 40nm/90nm CMOS 3D-stacked 120 dB dynamic-range reconfigurable time-resolved SPAD imager, in 2019 IEEE International Solid-State Circuits Conference—(ISSCC), IEEE, 2019, pp. 106-108.

K. Morimoto et al., Megapixel time-gated SPAD image sensor for 2D and 3D imaging applications, Optica, vol. 7, No. 4, pp. 346-354, 2020.

E. Charbon, Single-photon imaging in complementary metal oxide semiconductor processes, Philos Trans A Math Phys Eng Sci, vol. 372, No. 2012, p. 20130100, Mar. 2014.

I. Gyongy et al., High-speed vision with a 3D-stacked SPAD image sensor, in Advanced photon counting techniques XV, SPIE, 2021, p. 1172105.

F.M. Della Rocca et al. A 128×128 SPAD motion-triggered time-of-flight image sensor with in-pixel histogram and column-parallel vision processor, IEEE Journal of Solid-State Circuits, vol. 55, No. 7, pp. 1762-1775, 2020.

V. Sundar et al., SoDaCam: Software-defined cameras via single-photon imaging, in Proceedings of the IEEE International Conference on Computer Vision (ICCV), 2023.

D. Kim et al., A Multi-Resolution Mode CMOS Image Sensor with a Novel Two-Step Single-Slope ADC for Intelligent Surveillance Systems, Sensors, vol. 17, No. 7, Art. No. 7, Jul. 2017.

O. Iqbal et al., Design and FPGA Implementation of an Adaptive video Subsampling Algorithm for Energy-Efficient Single Object Tracking, in 2020 IEEE International Conference on Image Processing (ICIP), Oct. 2020, pp. 3065-3069.

J. Choi et al., A Spatial-Temporal Multiresolution CMOS Image Sensor With Adaptive Frame Rates for Tracking the Moving Objects in Region-of-Interest and Suppressing Motion Blur, IEEE Journal of Solid-State Circuits, vol. 42, No. 12, pp. 2978-2989, Dec. 2007.

M. Jin et al., Design of an Edge-Detection CMOS Image Sensor with Built-in Mask Circuits, Sensors (Basel), vol. 20, No. 13, p. 3649, Jun. 2020.

I. Gyongy et al., Direct Time-of-Flight Single-Photon Imaging, IEEE Transactions on Electron Devices, vol. 69, No. 6, pp. 2794-2805, Jun. 2022.

V. Sesta et al., Range-Finding SPAD Array With Smart Laser-Spot Tracking and TDC Sharing for Background Suppression, IEEE Open Journal of the Solid-State Circuits Society, vol. 2, pp. 26-37, 2022.

A.T. Erdogan et al., A 16.5 giga events/s 1024 × 8 SPAD line sensor with per-pixel zoomable 50ps-6.4ns/bin histogramming TDC, in 2017 Symposium on VLSI Circuits, Jun. 2017, pp. C292-C293.

F. Taneski et al., Laser Power Efficiency of Partial Histogram Direct Time-of-Flight LiDAR Sensors, Journal of Lightwave Technology, vol. 40, No. 17, pp. 5884-5893, Sep. 2022.

F. Taneski et al., Guided Direct Time-of-Flight Lidar Using Stereo Cameras for Enhanced Laser Power Efficiency, Sensors, vol. 23, No. 21, Art. No. 21, Jan. 2023.

B. Kim et al., 48×40 13.5mm Depth Resolution Flash LiDAR Sensor with In-Pixel Zoom Histogramming Time-to-Digital Converter, in 2021 IEEE International Solid- State Circuits Conference (ISSCC), Feb. 2021, pp. 108-110.

S.W. Hutchings et al., A Reconfigurable 3-D-Stacked SPAD Imager With In-Pixel Histogramming for Flash LIDAR or High-Speed Time-of-Flight Imaging, IEEE Journal of Solid-State Circuits, vol. 54, No. 11, pp. 2947-2956, Nov. 2019.

C. Zhang et al., A 30-frames/s, 252 × 144 SPAD Flash LiDAR With 1728 Dual-Clock 48.8-ps TDCs, and Pixel-Wise Integrated Histogramming, IEEE Journal of Solid-State Circuits, vol. 54, No. 4, pp. 1137-1151, Apr. 2019.

B. Tilmon et al., Energy-Efficient Adaptive 3D Sensing, presented at the Proceedings of the IEEE/CVF Conference on Computer Vision and Pattern Recognition, 2023, pp. 5054-5063. Accessed: Mar. 17, 2024, Online.

International Search Report and Written Opinion in corresponding PCT Application PCT/US25/23600, mailed Aug. 26, 2025.

Sizhou Ma et al., "Quanta Burst Photography", pp. 1-16, 79:2, ACM Trans Graph vol. 39 No. 4, Article 79, Jul. 2020.

Sizhou Ma et al., "Burst Vision Using Single-Photon Cameras", pp. 1-11, IEEE, 2023.

* cited by examiner

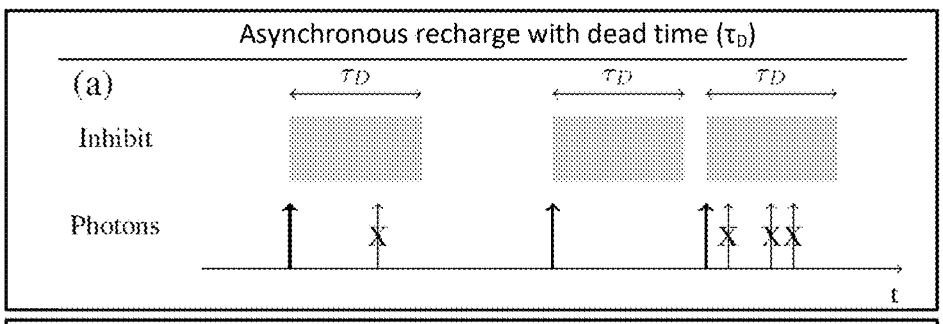
FIG. 7
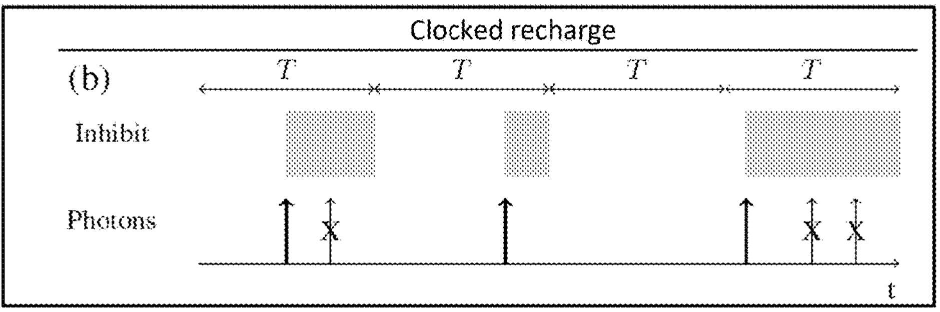
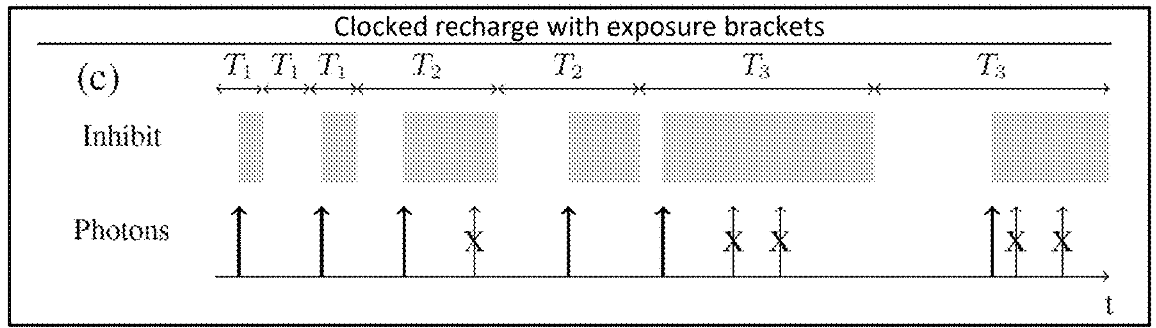
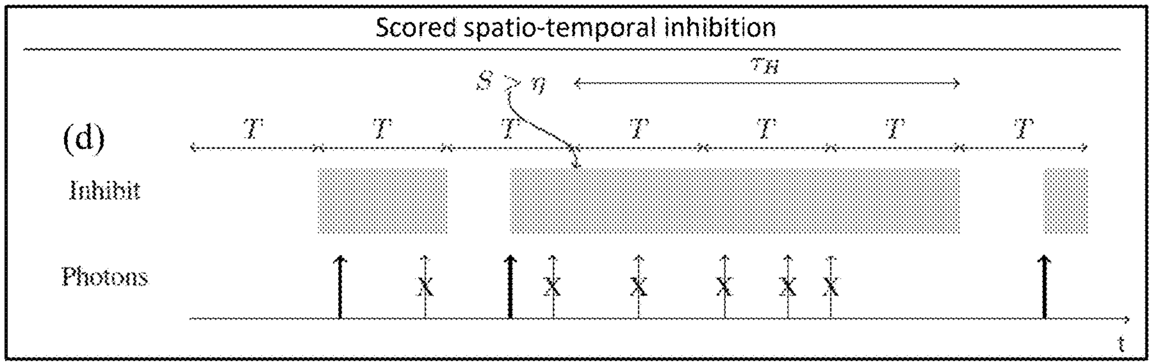
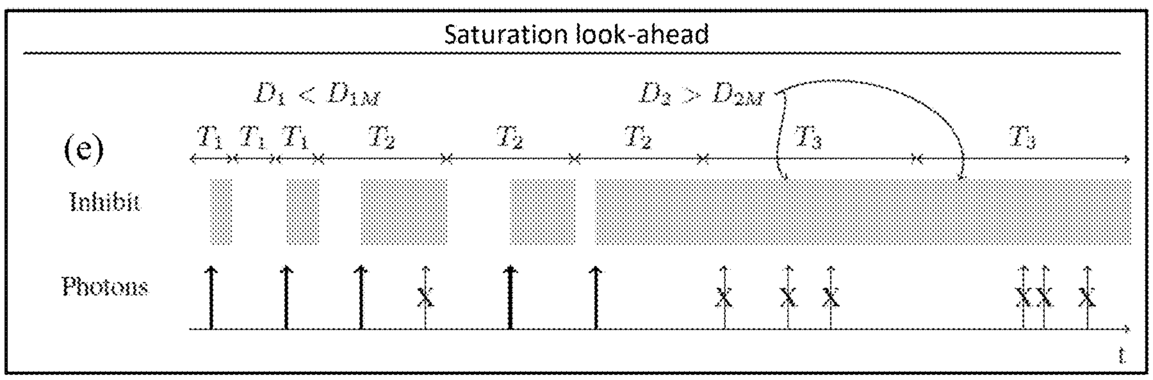

1100

SYSTEMS, METHODS, AND MEDIA FOR SINGLE-PHOTON IMAGING WITH IMPROVED ENERGY EFFICIENCY

STATEMENT REGARDING FEDERALLY SPONSORED RESEARCH

This invention was made with government support under 1943149 and 2138471 awarded by the National Science Foundation. The government has certain rights in the invention.

CROSS-REFERENCE TO RELATED APPLICATIONS

N/A

BACKGROUND

Recently, single-photon avalanche diodes (SPADs) that can detect individual photons, and precisely measure the time-of-arrival, have become more prevalent. From vacuum tube based single-photon detectors invented in the early 20th century, to 3D depth sensing LiDAR cameras incorporated in recent smartphones, single-photon camera (SPC) technology has come a long way in terms of pixel resolution and commercial availability for a variety of imaging applications. For example, CMOS-compatible pixel arrays that include single-photon avalanche diode (SPAD) sensors have facilitated SPCs being increasingly used not only in niche fields such as scientific imaging and biomedical microscopy, but more widely for other imaging applications, such as consumer photography. SPAD-based SPCs have recently been fabricated into kilo-to-megapixel format arrays. The extreme sensitivity and high speed of a SPAD-based SPC can benefit passive low-light computer vision tasks, particularly in the presence of high speed scene or camera motion, can facilitate wide dynamic-range imaging, and can facilitate photon-starved active imaging applications such as 3D imaging (LiDAR) and fluorescence microscopy.

SUMMARY

In accordance with some embodiments, a system for generating digital image data with improved energy efficiency is provided, the system comprising: an image sensor comprising a plurality of pixels arranged in an array, wherein each of the plurality of pixels comprises a detector of a plurality of detectors, and wherein each of the plurality of detectors is configured to generate a signal based on arrival of one or more photons during an exposure time; wherein the image sensor is configured to: generate, during a first period of time, first image data representing a scene, wherein the first image data comprises a first plurality of pixel values, each of the first plurality of pixel values associated with a pixel of the plurality of pixels, and wherein each pixel value of the first plurality of pixel values is based on a signal generated by the respective detector associated with the pixel during the first period of time; one or more processors configured to: determine, for each pixel, an inhibition value based on at least the pixel value associated with the pixel; determine, for a first pixel of the plurality of pixels based on the inhibition value associated with the first pixel, that the first pixel is to be inhibited during a second period of time; determine, for a second pixel of the plurality of pixels based on the inhibition value associated with the second pixel, that the second pixel is to be enabled during the second period of time; inhibit the first pixel during the second period of time; and cause the image sensor to generate, during the second period of time, second image data representing the scene, wherein the second image data comprises a second plurality of pixel values, each of the second plurality of pixel values corresponds to a pixel of the plurality of pixels, and wherein the second plurality of pixel values includes: a pixel value associated with the first pixel that is consistent with the first pixel being inhibited during the second period of time; and a pixel value associated with the second pixel that is based on a signal generated by the detector associated with the first pixel during the second period of time.

In some embodiments, the one or more processors are further configured to: generate a digital image based on the first image data and the second image data.

In some embodiments, the one or more processors are further configured to: perform a computer vision task using the first image data and the second image data.

In some embodiments, each of the plurality of detectors comprises a single photon avalanche diode (SPAD), the signal is indicative of whether the SPAD detected a photon during the exposure time, and the pixel value is a binary value that is a binary 1 when the signal indicates that the SPAD detected a photon during the exposure time, and 0 otherwise.

In some embodiments, the first image data comprises a first binary frame, the second image data comprises a second binary frame, and the value associated with the first pixel in the second frame is zero regardless of whether any photons arrived at the first pixel during the second period of time.

In some embodiments, the one or more processors are further configured to: inhibit the SPAD of the first pixel from detecting arrival of photons during the second period of time.

In some embodiments, the image sensor comprises: the plurality of detectors; and at least one of the one or more processors.

In some embodiments, the first period of time includes multiple exposures of a first exposure time $T_x$ which is a first multiple of a time T, and the second period of time corresponds to an exposure of a second exposure time $T_{x+1}$ that is a second multiple of the time T and $T_{x+1}>T_x$.

In some embodiments, the one or more processors are further configured to: cause the image sensor to generate a sequence of frames based on a predetermined sequence of exposure bracket cycles, wherein each of exposure bracket cycles generates at least one frame of the sequence of frames with an exposure time that is a multiple of the time T, wherein the first period of time corresponds to a first exposure bracket cycle, and the second period of time corresponds a second exposure bracket cycle that occurs later in the sequence of exposure bracket cycles than the first exposure bracket cycle; determine the inhibition value for the first pixel based on multiple pixel values associated with the first pixel during the first exposure bracket cycle; determine that the first pixel is to be inhibited during the second period of time based on the inhibition value for the first pixel exceeding a threshold $D_{xM}$ associated with the first exposure bracket cycle; determine the inhibition value for the second pixel based on multiple pixel values associated with the second pixel during the first exposure bracket cycle; and determine that the second pixel is to be enabled during the second period of time based on the inhibition value for the second pixel not exceeding the threshold $D_{xM}$.

In some embodiments, the first period of time corresponds to a single exposure of exposure time T, and the second period of time corresponds to another single exposure of exposure time.

In some embodiments, the one or more processors are further configured to: in response to determining that the first pixel is to be inhibited during the second period of time, cause the first pixel to be inhibited for a deadtime $\tau_H$ that begins at an end of the first period of time, wherein $\tau_H \geq 2T$.

In some embodiments, an inhibition value for the first pixel comprises a score, and wherein the score is based on a first pixel value in the first image data associated with the first pixel, and a plurality of pixel values associated with neighboring pixels of the first pixel.

In some embodiments, the first pixel has a location (i, j) in the array, the first image data represents the scene at a time t, and the first period of time includes time t, and wherein the one or more processors are further configured to: determine the score based on the following relationship: $S(i,j,t)=K*[(2F(i,j,t)-1)\cdot M(i,j,t)]$, where $S(i,j,t)$ is the score, K is a spatio-temporal kernel separable into a spatial component $K_s$ and a temporal component separated into spatial and temporal components as $K_t$ with dimensions W×H×1 and 1×1×L, respectively, and $K=K_s \otimes K_t$, $F(i,j,t)$ is a tensor with dimensions W×H×L that includes image data generated by a group of W×H neighboring pixels including the first pixel for each of L most recent exposures, and $M(i,j,t)$ is a tensor with dimensions W×H×L that includes an indication of whether each pixel in the group of W×H neighboring pixels was inhibited during each of the L most recent exposures; determine that the score exceeds a threshold $\eta$; and in response to determining that the score exceeds the threshold $\eta$, determine that the first pixel is to be inhibited during the second period of time.

In some embodiments, values of K and $\eta$ are associated with a particular computer vision task, and the values of K and $\eta$ were set as a result of an automated training process that determined the values based on results generated from performing the particular computer vision task on training data using the inhibition policy and a plurality of different combinations of values for K and $\eta$, where final values of K and $\eta$ are associated with improved performance of the computer vision task.

In some embodiments, each of the plurality of detectors comprises a photodiode included in a complementary metal-oxide semiconductor (CMOS) pixel, the signal is indicative of a brightness of a portion of the scene corresponding to the pixel, and the pixel value is a multi-bit digital value indicative of the brightness of the portion of the scene corresponding to the pixel.

In accordance with some embodiments, a method for generating digital image data with improved energy efficiency is provided, the method comprising: generating, during a first period of time using an image sensor, first image data representing a scene, wherein the image sensor comprises a plurality of pixels arranged in an array, each of the plurality of pixels comprises a detector of a plurality of detectors, and each of the plurality of detectors is configured to generate a signal based on arrival of one or more photons during an exposure time, wherein the first image data comprises a first plurality of pixel values, each of the first plurality of pixel values associated with a pixel of the plurality of pixels, and wherein each pixel value of the first plurality of pixel values is based on a signal generated by the respective detector associated with the pixel during the first period of time; determining, for each pixel, an inhibition value based on at least the pixel value associated with the pixel; determining, for a first pixel of the plurality of pixels based on the inhibition value associated with the first pixel, that the first pixel is to be inhibited during a second period of time; determining, for a second pixel of the plurality of pixels based on the inhibition value associated with the second pixel, that the second pixel is to be enabled during the second period of time; inhibiting the first pixel during the second period of time; and causing the image sensor to generate, during the second period of time, second image data representing the scene, wherein the second image data comprises a second plurality of pixel values, each of the second plurality of pixel values corresponds to a pixel of the plurality of pixels, and wherein the second plurality of pixel values includes: a pixel value associated with the first pixel that is consistent with the first pixel being inhibited during the second period of time; and a pixel value associated with the second pixel that is based on a signal generated by the detector associated with the first pixel during the second period of time.

In some embodiments, the method further comprises: generating a digital image based on the first image data and the second image data.

In some embodiments, the method further comprises: performing a computer vision task using the first image data and the second image data.

In some embodiments, each of the plurality of detectors comprises a single photon avalanche diode (SPAD), the signal is indicative of whether the SPAD detected a photon during the exposure time, and the pixel value is a binary value that is a binary 1 when the signal indicates that the SPAD detected a photon during the exposure time, and 0 otherwise.

In some embodiments, the first image data comprises a first binary frame, the second image data comprises a second binary frame, and the value associated with the first pixel in the second frame is zero regardless of whether any photons arrived at the first pixel during the second period of time.

In accordance with some embodiments, a non-transitory computer readable medium containing computer executable instructions that, when executed by a processor, cause the processor to perform a method for generating digital image data with improved energy efficiency is provided, the method comprising: generating, during a first period of time using an image sensor, first image data representing a scene, wherein the image sensor comprises a plurality of pixels arranged in an array, each of the plurality of pixels comprises a detector of a plurality of detectors, and each of the plurality of detectors is configured to generate a signal based on arrival of one or more photons during an exposure time, wherein the first image data comprises a first plurality of pixel values, each of the first plurality of pixel values associated with a pixel of the plurality of pixels, and wherein each pixel value of the first plurality of pixel values is based on a signal generated by the respective detector associated with the pixel during the first period of time; determining, for each pixel, an inhibition value based on at least the pixel value associated with the pixel; determining, for a first pixel of the plurality of pixels based on the inhibition value associated with the first pixel, that the first pixel is to be inhibited during a second period of time; determining, for a second pixel of the plurality of pixels based on the inhibition value associated with the second pixel, that the second pixel is to be enabled during the second period of time; inhibiting the first pixel during the second period of time; and causing the image sensor to generate, during the second period of time, second image data representing the scene, wherein the second image data comprises a second plurality of pixel values, each of the second plurality of pixel values corresponds to a pixel of the plurality of pixels, and wherein the second plurality of pixel values includes: a pixel value associated with the first pixel that is consistent with the first pixel being inhibited during the second period of time; and a pixel value associated with the second pixel that is based on a signal generated by the detector associated with the first pixel during the second period of time.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 7 shows an example of various static inhibition policies and various dynamic inhibition policies implemented in accordance with some embodiments of the disclosed subject matter.

DETAILED DESCRIPTION

Figure 1:
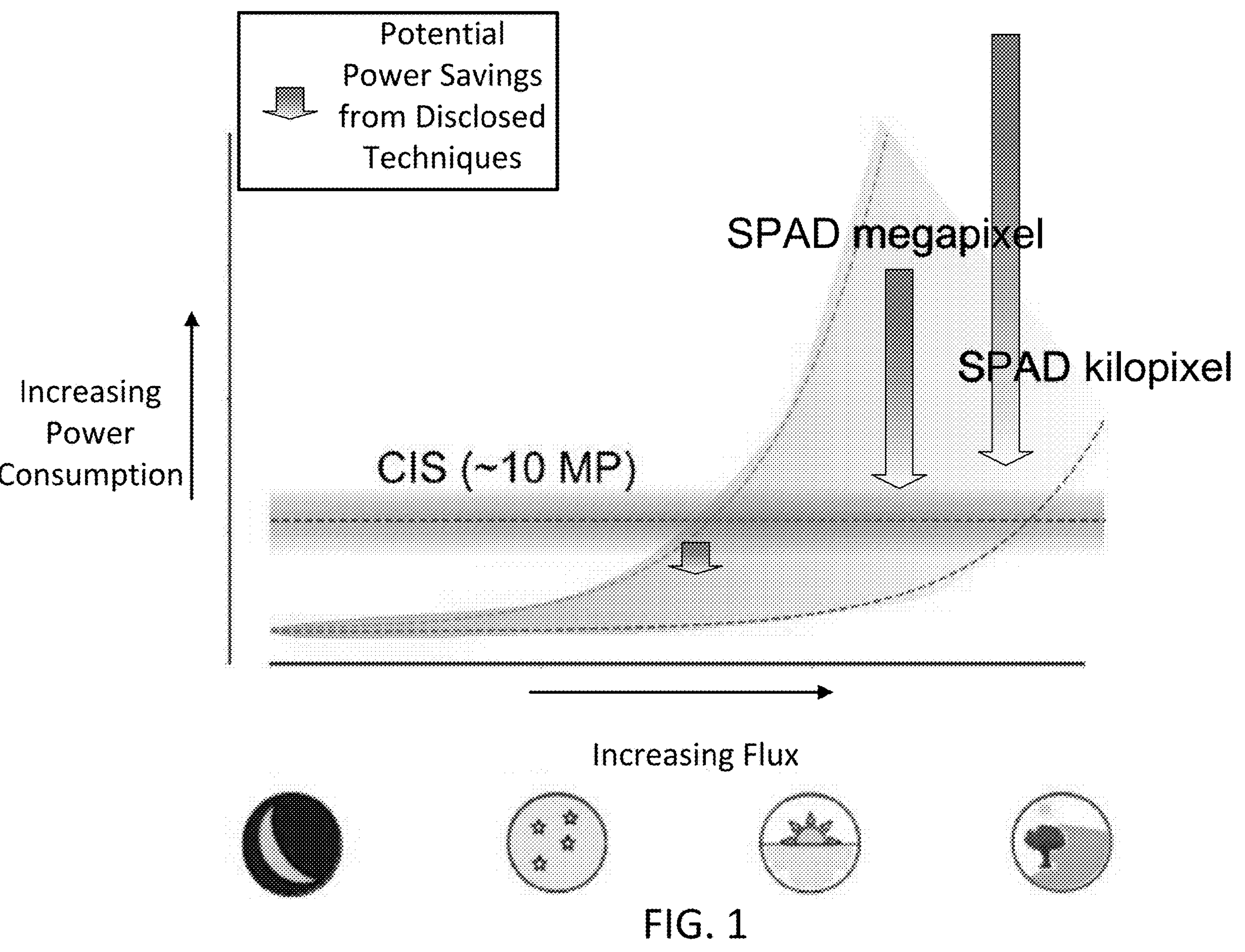
FIG. 1 shows an example of estimated power use of conventional CMOS image sensors, conventional SPAD image sensors, and power savings that can be expected in SPAD image sensors implemented in accordance with some embodiments of the disclosed subject matter.

In accordance with various embodiments, mechanisms (which can, for example, include systems, methods, and media) for single-photon imaging with improved energy efficiency are provided.

In accordance with some embodiments of the disclosed subject matter, mechanisms described herein can improve the energy efficiency of an image sensor with pixels implemented using single-photon avalanche diodes (SPAD) by identifying pixels that are unlikely to detect informative photons, and preventing those pixels from detecting the photons. As described below, every photon detection by a SPAD is associated with a significant energy consumption (e.g., to recharge the SPAD for a subsequent photon detection). In some embodiments, inhibiting detection of photons that are unlikely to be informative for a particular task (e.g., generating a digital image for display, generating a digital image and/or image data for scientific analysis, generating image data for a particular computer vision task, etc.) can reduce consumption of power to detect photons that are not useful for the task. For example, as described below in connection with FIGS. 3 and 14, mechanisms described herein can facilitate energy-efficient generation of image data that can be used for edge detection by inhibiting the detection of photons from more uniform portions of a scene, and permitting detection of photons from portions of the scene that include an edge. As another example, as described below in connection with FIGS. 12, 13, and 15, mechanisms described herein can facilitate energy efficient generation of image data that can be used to reconstruct a high dynamic range and/or high quality digital image(s) (and/or frames of high quality digital video) by inhibiting detection of photons from brighter portions of a scene, and permitting detection of photons from lower flux portions of the scene.

In general, single-photon cameras (SPC) can outperform conventional camera technology (e.g., using a conventional complimentary metal-oxide-semiconductor (CMOS) image sensor) in various challenging imaging applications. For example, SPCs can implemented using an image sensor that includes an array of SPADs (e.g., a relatively large sensor having thousands to millions of pixels), which can be configured to detect arrival of individual photons using an avalanche process in each SPAD. In such an example, raw photon detection data can be processed to extract scene information under extremely low light, high dynamic range, and/or rapid motion. However, in a SPAD-based SPC single-photon sensitivity comes at a cost, as each photon detection by a SPAD causes a relatively large energy expenditure compared to an amount of energy expended in a conventional CMOS pixel when a single photon is received at the conventional CMOS pixel. The amount of energy that can be incurred due to avalanche detections can limit sensor resolution and the widespread adoption of SPAD-based SPCs, as an energy budget in many imaging applications is limited (e.g., due to battery capacity and/or discharge rates, device efficiency requirements, etc.).

In some embodiments, mechanisms described herein can facilitate implementation of a computational-imaging framework (sometimes referred to herein as photon inhibition) which can improve energy efficiency of SPCs. Photon inhibition implemented using mechanisms described herein can strategically allocate detections in space and time based on vision task goals and/or resource constraints. As described below, in some embodiments, mechanisms described herein can be used to implement lightweight, on-sensor computational inhibition policies that use past photon data to inhibit SPAD pixels from detecting photons in real-time. For example, mechanisms described herein can be implemented to select pixels that are expected to detect the most informative future photons. As described below in connection with FIGS. 12-14, simulations using mechanisms described herein have been performed that demonstrate reductions in photon detections at equal performance with policies tailored for image quality and edge maps. Additionally, as described below in connection with FIG. 15, on real-world videos captured by an SPC, inhibition policies can be implemented using mechanisms described herein that can adapt to light levels to maintain task performance while inhibiting over 90% of photon detections and can reduce the associated energy consumed when a SPAD detects those photons.

In some embodiments, camera sensors implemented with pixels that utilize SPAD detectors can detect individual photons with extremely high frame rates by exploiting avalanche multiplication. Such cameras can be implemented with relatively large fields of view, and a relatively high spatial resolution (e.g., a relatively high number of pixels on the order of thousands to millions of pixels). On one hand, being able to detect arrival of individual photons with high temporal resolution (e.g., on the order of pico-seconds) opens up new possibilities and capabilities for computer vision systems. However, SPAD detectors can also present a unique challenge, as every photon-induced avalanche comes with a non-negligible energy cost, which is a challenge that is currently exclusive to SPAD-based camera sensors. As described below in connection with FIG. 1, power consumption by a SPAD-based pixel is generally dependent on the flux incident on the pixel. In low light conditions, such a pixel may consume very little energy, while in brighter conditions (e.g., in partial or full sunlight) the amount of energy consumed by each pixel increases dramatically. Such flux-dependent photon detection power can be a significant fraction of total power consumption in SPAD cameras that use conventional exposure techniques, which can impede further increases in the spatial resolution of a SPAD-based image sensor.

As described below in connection with FIGS. 12-15, in simulations and experiments, inhibition policies described herein can be used to allocate a constrained number of photon detections to sensor pixels in a way that improves the overall accuracy of an end computer vision task and relaxes the dependence of vision metrics on the number of photons captured. Results described herein show that tasks such as image reconstruction (see, e.g., FIGS. 13 and 15), edge detection (see, e.g., FIG. 14), and object detection (see, e.g., FIG. 12) can be reliably performed under energy-constrained scenarios even with a large fraction of photons inhibited. In some embodiments, mechanisms described herein can be used to implement inhibition policies that are suited for implementation on future (e.g., higher spatial resolution and/or more energy efficient) SPAD sensor arrays, which can facilitate development of energy-efficient high-fidelity single-photon imaging (see, e.g., description of experiments with photon streams captured using a real-world SPC described below in connection with FIG. 15).

There is a strong dependence of SPAD power consumption on the pixel size. For example, the smaller the pixel, the lower the avalanche energy. Although recent developments in SPAD pixel technology have reduced pixel sizes to below 4 micrometers (μm), avalanche energy still contributes a large fraction of the total power consumption in a SPAD sensor. Additionally, SPAD design optimizations have reduced the charge per avalanche using radio frequency (RF) modulation of the bias voltage, minimization of the junction capacitance, and improved quenching circuits. Circuit architectures may require spatial and/or temporal coincidence to reduce energy downstream in the processing chain, but avalanche energy remains. As described below in connection with FIG. 1, the total energy consumed by photon avalanches is not constant; it increases in brighter scene regions. This challenge cannot be fully addressed through SPAD design optimization alone. In some embodiments, mechanisms described herein can be used in combination with existing hardware approaches by preventing avalanches altogether to reduce illumination-dependent energy consumption.

Advances in 3D chip-stacking can facilitate pixel-parallel connections between a SPAD chip and a logic chip, and can facilitate large-format image sensors with in-pixel photon counters and timing circuits. Existing approaches for reducing pixel power consumption combine a constrained number of photon counts with timing information, or limit the maximum detection rates at high photon flux by constraining the rate of SPAD recharge. However, power consumed by avalanches remains a considerable fraction of total SPAD sensor power consumption (e.g., over 50% in the sensor described in Takatsuka et al., "A 3.36 μm-pitch SPAD photon-counting image sensor using clustered multi-cycle clocked recharging technique with intermediate most-significant-bit readout," in 2023 IEEE Symposium on VLSI Technology and Circuits (VLSI Technology and Circuits), pages 1-2, 2023), and is an important challenge to overcome for practical photon-counting imaging that can simultaneously achieve megapixel resolution and wide dynamic range. In some embodiments, mechanisms described herein that selectively inhibit photon detections (and corresponding power consumption due to avalanches) can be implemented on-sensor, using lightweight computations, that leverage recent developments of in-pixel computing architectures.

In some embodiments, mechanisms described herein can be used to generate high quality images using a sequence of binary images of a scene generated using an image sensor implemented using an array of detectors that are capable of detecting single photons at relatively high frame rates. For example, such an image sensor can be implemented using an array of SPADs. Until recently, arrays of single photon detectors were limited in size, and accordingly limited to specialized applications. For example, SPADs were available as single-pixel or small arrays (e.g., up to 32×32 pixels), which were sufficient for several scientific imaging applications and specialized active imaging scenarios (e.g., LiDAR), but are not suitable for consumer domain imaging due to the very low resolution. However, due to the compatibility of SPAD technology with mainstream CMOS fabrication techniques, larger SPAD arrays (e.g., on the order of megapixels) have recently been developed that are capable of maintaining high sensor quality, while operating at room temperature. SPAD arrays can achieve very high frame rates in comparison to conventional image sensors (e.g., CMOS active pixel sensors) on the order of tens of thousands of frames per second to in excess of one hundred thousand frames per second (i.e., SPAD arrays can be configured to generate binary frames at rates of 1,000+ fps, 10,000+ fps, and even 100,000+ fps) with zero read noise.

As another example, jot-based sensor arrays with very small pixel pitch (e.g., sub-2 micron) that are capable of detecting the arrival of a single photon have been implemented using CMOS technology. As a more particular example, jot-based sensors are described in Fossum et al., "The Quanta Image Sensor: Every Photon Counts," Sensors, 16, 1260 (2016). Jot-based devices have a higher fill factor and lower dark current than SPADs, but non-negligible read noise. Note that although mechanisms described herein are generally described in connection with SPADs, this is merely an example, and mechanisms described herein can be used in connection with other quanta image sensors, SPAD-based arrays and jot-based arrays being two current examples. Of these two examples, SPAD-based image sensors can be configured to temporally oversample the incoming light (e.g., by generating frames at very high frame rates), and jots can spatially oversample the incident light using the higher fill factor (e.g., based on the smaller pixel pitch that can be achieved with jots). Additionally, as described below, mechanisms described herein can be used in connection with conventional image sensors to reduce power consumption.

FIG. 1 shows an example of estimated power use of conventional CMOS image sensors (CIS), conventional SPAD image sensors, and power savings that can be expected in SPAD image sensors implemented in accordance with some embodiments of the disclosed subject matter.

As shown in FIG. 1, unlike sensors in conventional CMOS cameras, the energy consumption in SPAD cameras increases with scene brightness, severely limiting the applicability of high resolution SPAD cameras in resource-constrained applications. In a conventional CIS, relatively little power is consumed during accumulation of charge in each pixel during the exposure time, and a relatively large portion of overall power consumption is incurred during readout of the data from each pixel (e.g., during analog to digital conversion, column or frame buffering, etc.).

In a SPAD-based image sensor, each avalanche caused by a photon detection incurs an energy cost (e.g., incurred during recharge of the SPAD). Accordingly, if there is relatively little light, relatively few photon detections can be expected to occur, and subsequently a SPAD-based sensor can be expected to consume relatively little power. For example, extrapolating from avalanche power of a recent SPAD sensor (described in Takatsuka et al., "A 3.36 μm-pitch SPAD photon-counting image sensor using clustered multi-cycle clocked recharging technique with intermediate most-significant-bit readout," 2023 IEEE Symposium on VLSI technology and Circuits (2023)) to an array that includes tens of megapixels predicts a power consumption that varies from much lower than a conventional CIS in low light (e.g., a scene with ambient light on the order of 1,000 photons arriving at each pixel each second) to much greater than a conventional CIS in bright (e.g., a scene with ambient light on the order of 1,000,000 photons arriving at each pixel each second). A modern 10 megapixel (MP) conventional CIS can be expected to consume a few hundred milliwatts (mW) (e.g., about 300 mW) of power during imaging over a wide range of scene brightnesses, whereas a kilopixel (kP) SPAD array can be can be expected to consume from tens of mW in low light to more than a few hundred mWs, and a 10 MP SPAD array can be can be expected to consume upwards of 1 W in even moderately bright light (e.g., an outdoor scene during sunrise or sunset, or a scene with ambient light on the order of 100,000 photons arriving at each pixel each second).

As shown in FIG. 1, implementing mechanisms described herein in a SPAD-based image sensor can be expected to reduce power consumed by a SPAD sensor by larger amounts in brighter scenes. For example, a MP-scale SPAD-based image sensor that is implemented in accordance with some embodiments of the disclosed subject matter can be expected to reduce power consumption by a relatively modest amount in very low and relatively low light scenes, and can be expected to reduce power consumption in brighter scenes by larger amounts with increasing brightness. In some imaging and/or computer vision tasks, utilizing mechanisms described herein with an appropriate inhibition policy can be expected to reduce power consumption of a SPAD-based image sensor to a similar order of magnitude as a conventional CMOS image sensor (e.g., in higher flux environments).

Figure 2:
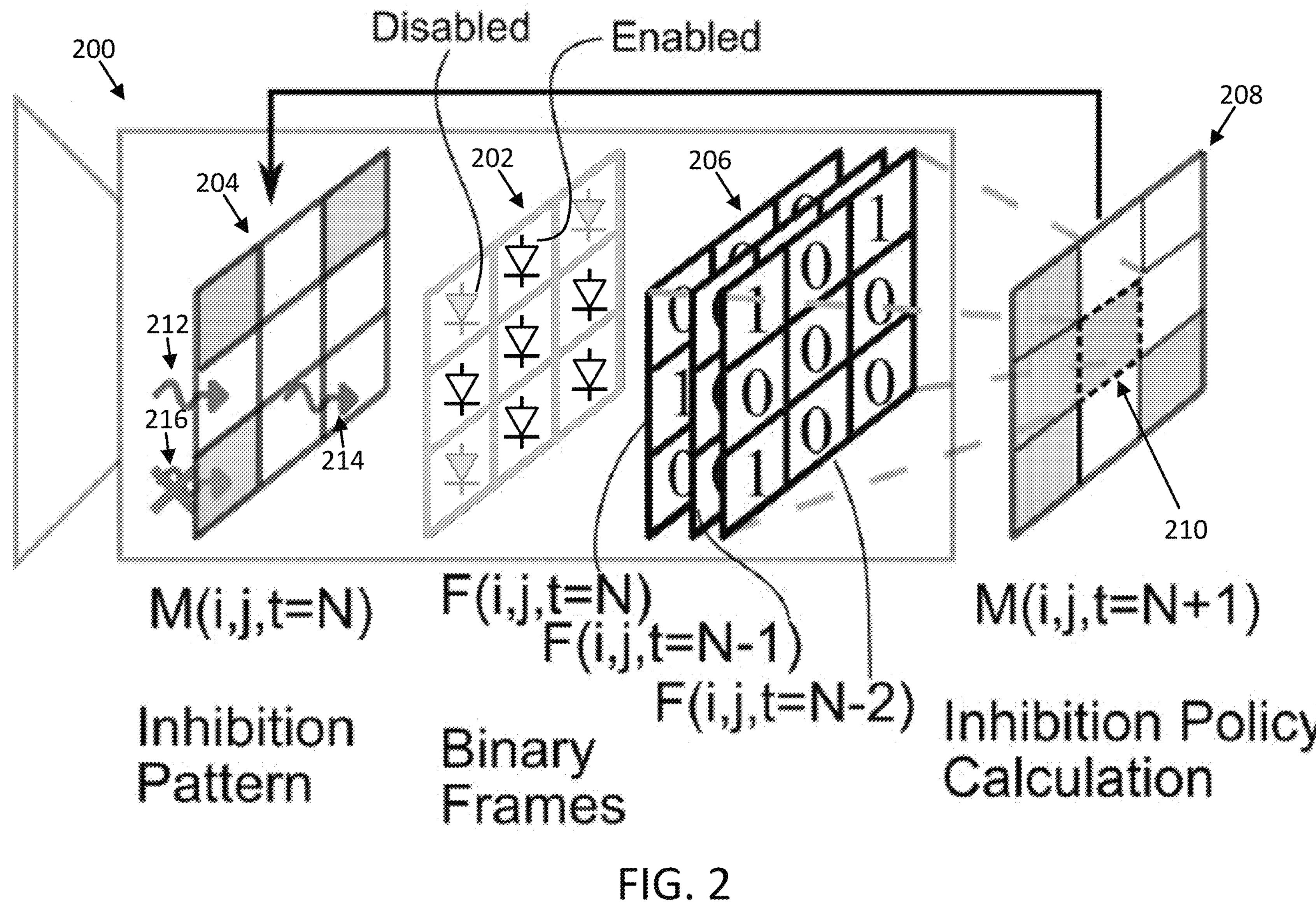
FIG. 2 shows an example of a SPAD-based imager controlled to selectively inhibit photon detections in accordance with some embodiments of the disclosed subject matter.

FIG. 2 shows an example of a SPAD-based imaging device 200 controlled to selectively inhibit photon detections in accordance with some embodiments of the disclosed subject matter. In some embodiments, SPAD-based pixels 202 can be implemented as part of a monochrome image sensor (e.g., not including individual color filters associated with one or more pixels) or a color image sensor (e.g., including individual color filters associated with one or more pixels). In some embodiments, individual pixels SPAD-based pixels 202 can be associated with any suitable filters, such as an infrared cut filter that reduces the amount of infrared light that can be received by the pixel, a neutral density filter that reduces the total amount of light that can be received by the pixel, a color filter that reduces the amount of light outside a particular color band that can be received by the pixel, etc. For example, pixels of the image sensor can be configured as a repeating pattern of a group of four pixels, with each pixel being associated with a different filter (e.g., a different color filter, arranged in a Bayer pattern).

In some embodiments, mechanisms described herein can be used to incorporate "inhibition" into a SPAD imaging pipeline that selectively (e.g., electronically) enables or disables individual pixels in an array of SPAD-based pixels 202, which can reduce bandwidth and power consumption during generation of image data from a SPAD-based imager. In some embodiments, mechanisms described herein can utilize relatively lightweight mathematical operations (sometimes referred to herein as "inhibition policies") that dynamically update an inhibition pattern applied to the image sensor during a frame(s) based on a history of photon detections at a pixel and/or group of pixels. For example, in some embodiments, mechanisms described herein can be used to proactively select which photons are to be detectable by various SPAD-based pixels of an image sensor without significantly degrading image quality and/or degrading performance of various computer vision tasks.

In some embodiments, mechanisms described herein can reduce power consumption due to avalanches and can decouple power consumption from photon flux. For example, mechanisms described herein can be used to implement a computational imaging technique sometimes referred to herein as photon inhibition, where individual SPAD pixels are adaptively disabled based on previous photon detections in the spatio-temporal neighborhoods of the pixel. Electrically disabling SPAD pixels can stop photons that arrive at the pixel from causing a detection event (e.g., an avalanche) to inhibit any detection power or subsequent processing associated with the photon.

In some embodiments, lightweight on-sensor computations (e.g., inhibition policies) can be used to determine, in real-time and with at least single-pixel and/or single-frame granularity, which SPAD pixels to enable or disable in a subsequent frame(s). For example, a set of binary frames 206 can be generated from SPAD-based pixels 202, some of which have been selectively disabled during a current exposure time (e.g., a frame captured at time t=N) based on an inhibition pattern 204 that was based on photon detections in previous frames (e.g., frames captured at t=N−1, t=N−2, and t=N−3). As shown in FIG. 2, during capture of frame N, inhibition pattern 204 caused three of the nine pixels of SPAD-based pixels 202 to be inhibited from detecting photons, and photons 212, 214, and 216 were incident on SPAD-based pixels 202 during frame N. As shown, due to the lower left pixel being disabled (based on inhibition pattern 204), although photon 216 arrives at the SPAD during the frame, the SPAD does not detect arrival of photon 216 (i.e., the binary value of the lower left pixel in frame N is "0" despite a photon arriving at the pixel during the frame). In some embodiments, an inhibition policy 208 for a next frame (e.g., a frame to be captured at t=N+1) can be determined based on the values in binary frames 206 for the three most recent frames. An inhibition policy 210 for the center pixel can change to inhibit the center pixel during frame N+1, which can be used to inhibit the center pixel from detecting any pixels during at least the next frame.

In some embodiments, calculations that utilize data from multiple pixels can be carried out using any suitable technique or combination of techniques. For example, circuitry associated with each pixel can be connected to circuitry associated with one or more neighboring pixels, such that circuitry associated with each pixel can receive data output by the neighboring pixel(s), and can determine whether to inhibit upcoming detections of the pixel based on computations performed by circuitry on the sensor associated with the pixel. In such an example, every pixel of a sensor can be connected to a suitable number of neighboring pixels (e.g., eight neighboring pixels in a 3×3 pixel patch). Alternatively, groups of pixels can be connected together, such that a central pixel(s) of the group is connected to more pixels that a pixel(s) at an edge of the group (e.g., a central pixel in a 3×3 group of pixels can be connected to the other eight pixels, a corner pixel in the 3×3 group of pixels can be connected to three neighboring pixels, and an edge pixel in the 3×3 group of pixels can be connected to five neighboring pixels).

Additionally, formalized efficiency metrics and assessment techniques for resource-constrained single-photon imaging are described herein, and an additional description is included in Appendix A, which is hereby incorporated by reference herein in its entirety. Such metrics and techniques can be used to evaluate different inhibition policies, including implicit inhibition policies implemented in current SPAD-based sensors, and additional inhibition policies described herein. In some embodiments, metrics and techniques described herein can be used to evaluate different inhibition policies, and can be used to identify explicit inhibition policies that distribute photon detections in space and/or time based on vision task goals and energy consumption constraints. The raw data output from a SPAD-based image sensor (e.g., binary-valued image frames) is well suited to real-time calculations on the image sensor plane. Inhibition policies described herein are lightweight, requiring only simple arithmetic and Boolean operations computed over local spatio-temporal neighborhoods, and thus are well suited for in-pixel implementation on a SPAD-based sensor.

Figure 3:
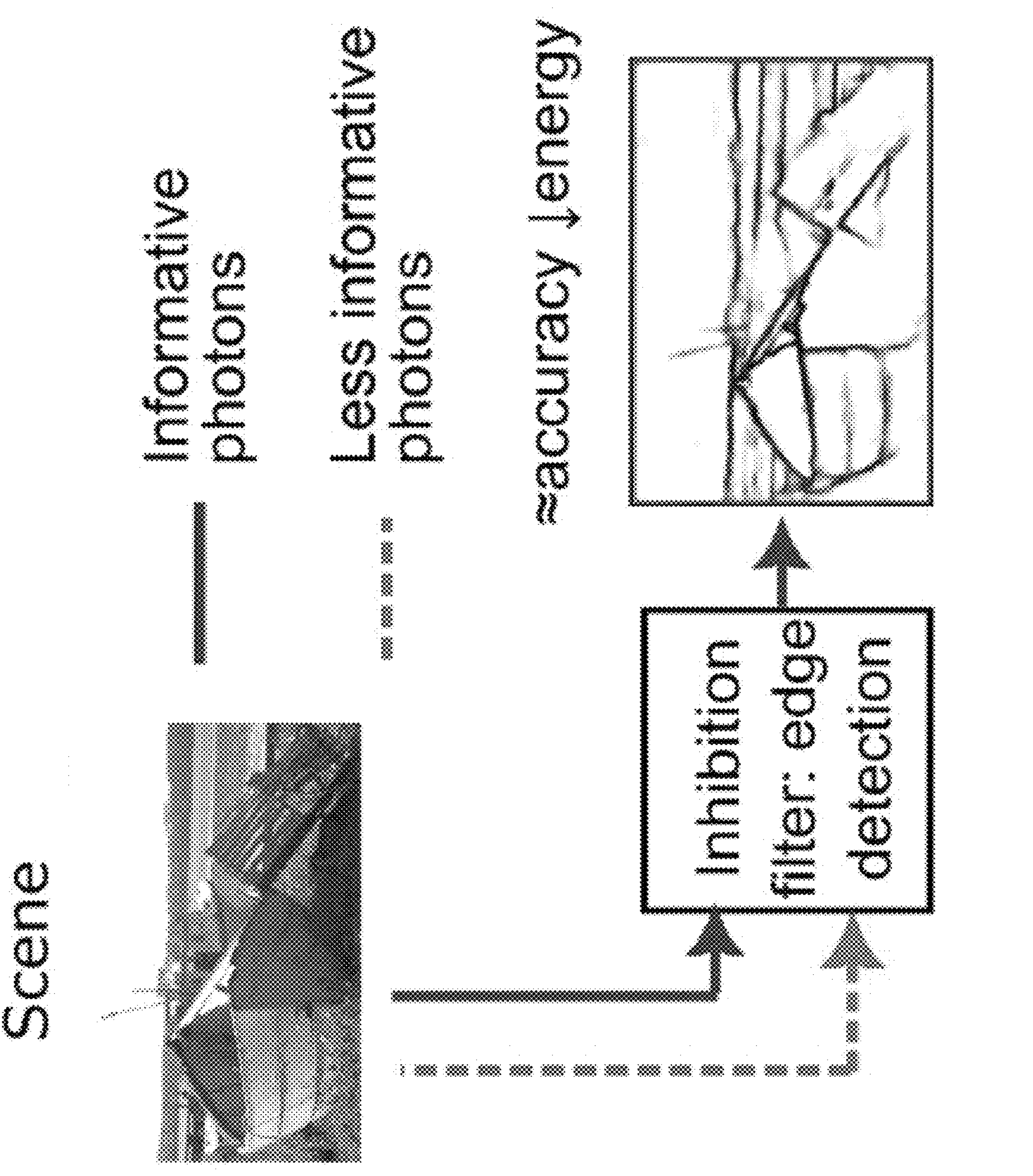
FIG. 3 shows an example that utilizes mechanisms described herein to facilitate a particular computer vision task with improved energy efficiency in accordance with some embodiments of the disclosed subject matter.

FIG. 3 shows an example that utilizes mechanisms described herein to facilitate a particular computer vision task with improved energy efficiency in accordance with some embodiments of the disclosed subject matter. As illustrated in FIG. 3, an inhibition filter (e.g., a particular inhibition policy or combination of policies) can be implemented using mechanisms described herein that facilitates an edge detection task. The inhibition filter can serve as a task-specific photon filter that passes informative photons (e.g., by allowing detection of informative photons) and inhibits less relevant photons (e.g., by inhibiting a SPAD(s) that would otherwise detect the less informative photons) so that task performance can be maintained while reducing the power consumed while performing the task. As described herein, inhibition policies can be implemented in accordance with mechanisms described herein that improve image SNR holding photon detections per pixel constant (e.g., as described below in connection with FIG. 13), facilitate low-level computer vision tasks, such as edge detection, with lower power consumption and/or improved performance (e.g., with similar power consumption), etc.

In some embodiments, mechanisms described herein can reduce power consumption by SPAD pixels by inhibiting the detection of photons that are unlikely to provide information that can be used to perform a computer vision task. For example, as shown in FIG. 3, described below in connection with FIG. 14, and described in Appendix A, mechanisms described herein can be used to reduce detections of photons (and associated power consumption) that are less useful for an edge detection task (e.g., from portions of the scene that do not include edges), and detect photons that are more useful for an edge detection task.

Figure 4:
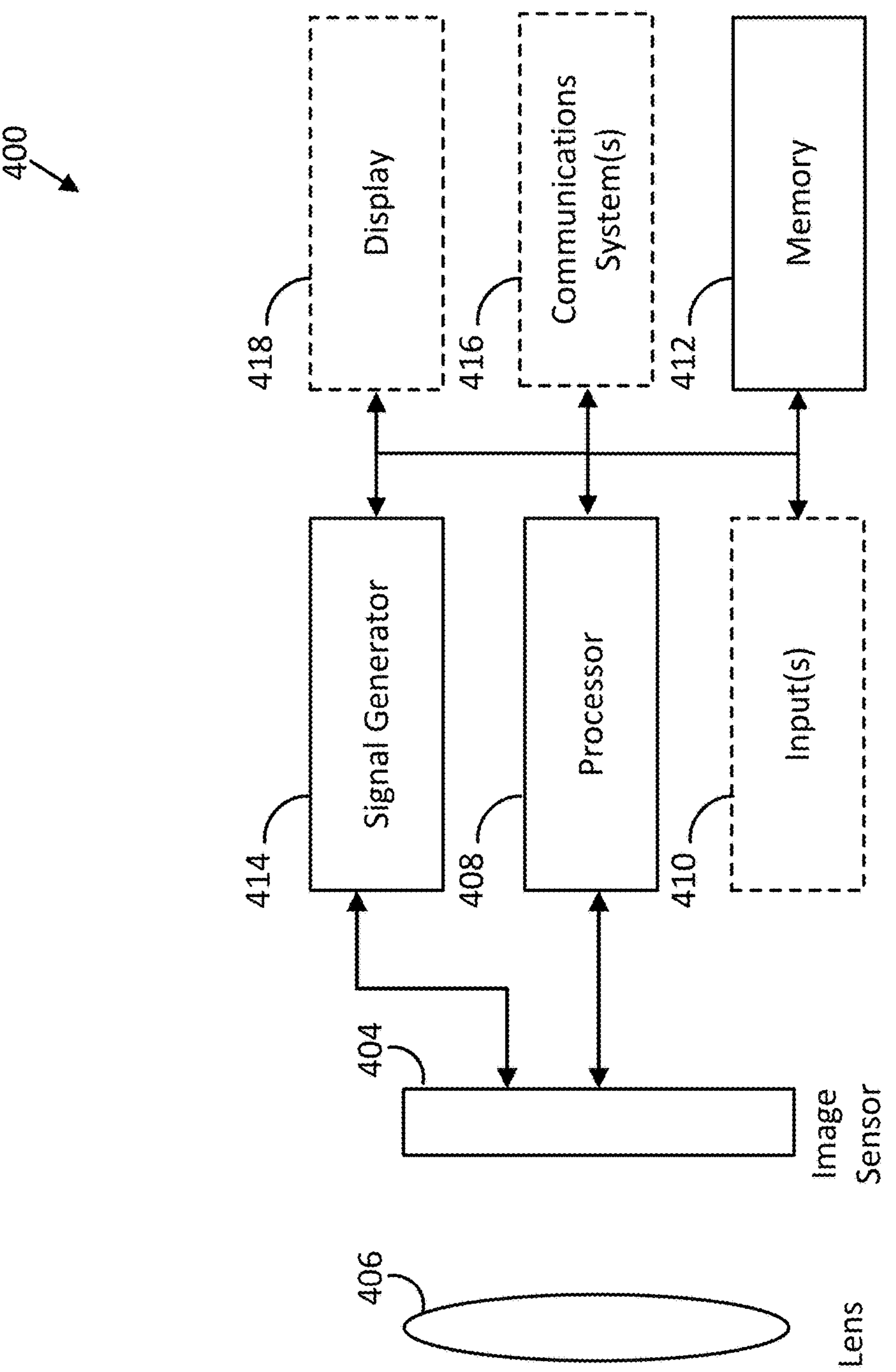
FIG. 4 shows an example of a system for single-photon imaging with improved energy efficiency in accordance with some embodiments of the disclosed subject matter.

FIG. 4 shows an example of a system for single-photon imaging with improved energy efficiency in accordance with some embodiments of the disclosed subject matter.

As shown, system 400 can include an image sensor 404 (e.g., an area sensor that includes an array of single photon detectors); optics 406 (which can include, for example, one or more lenses, one or more attenuation elements such as a filter, a diaphragm, and/or any other suitable optical elements such as a beam splitter, etc.); a processor 408 for controlling operations of system 400 which can include any suitable hardware processor (e.g., which can be a central processing unit (CPU), a graphics processing unit (GPU), an accelerated processing unit (APU), a digital signal processor (DSP), a microcontroller (MCU), a field-programmable gate array (FPGA), an application specific integrated processor (ASIC), etc.) or combination of hardware processors; an input device(s) 410 (such as a shutter button, a menu button, a microphone, a touchscreen, a motion sensor, etc., or any suitable combination thereof) for accepting input from a user and/or from the environment; memory 412; a signal generator 414 for generating one or more signals to control operation of image sensor 404; a communications system or systems 416 for facilitating communication between system 400 and other devices, such as a smartphone, a wearable computer, a tablet computer, a laptop computer, a personal computer, a server, an embedded computer (e.g., for controlling an autonomous vehicle, robot, etc.), etc., via a communication link; and a display 418 (such as a liquid crystal display (LCD), a light emitting diode (LED) display, a touchscreen, etc., or any suitable combination thereof), for presenting information (e.g., images, user interfaces, etc.) to a user. In some embodiments, memory 412 can store image data, and/or any other suitable data. Memory 412 can include a storage device (e.g., random access memory (RAM), read-only memory (ROM), electronically erasable programmable read-only memory (EEPROM), one or more flash drives, one or more hard disks, one or more solid state drives, one or more optical drives, etc.) for storing a computer program for controlling processor 408.

In some embodiments, image sensor 404 can be an image sensor that is implemented at least in part using an array of SPAD detectors (sometimes referred to as a Geiger-mode avalanche diode) and/or one or more other detectors that are configured to detect the arrival of individual photons. In some embodiments, one or more elements of image sensor 404 can be configured to generate data indicative of the arrival time of photons from the scene via optics 406. For example, in some embodiments, image sensor 404 can be an array of multiple SPAD detectors. As yet another example, image sensor 404 can be a hybrid array including SPAD detectors and one or more conventional light detectors (e.g., CMOS-based pixels). As still another example, image sensor 404 can be multiple image sensors, such as a first image sensor that includes an array of SPAD detectors that can be used to generate information about the brightness of the scene and a second image sensor that includes one or more conventional pixels that can be used to generate information about the colors in the scene. In such an example, suitable optical elements (e.g., multiple lenses, a beam splitter, etc.) can be included in optics 406 to direct a portion of incoming light toward the SPAD-based image sensor and another portion toward the conventional image sensor.

In some embodiments, system 400 can include additional optics. For example, although optics 406 is shown as a single lens, optics 406 can be implemented as a compound lens or combination of lenses.

In some embodiments, signal generator 414 can be implemented using one or more signal generators that can generate signals to control image sensor 404. For example, in some embodiments, signal generator 414 can supply signals to enable and/or disable one or more pixels of image sensor 404 (e.g., by controlling a gating signal of a SPAD used to implement the pixel). As another example, signal generator 414 can supply signals to control readout of image signals from image sensor 408 (e.g., to memory 412, to processor 408, to a cache memory associated with image sensor 404, etc.).

In some embodiments, system 400 can communicate with a remote device over a network using communication system(s) 416 and a communication link. Additionally or alternatively, system 400 can be included as part of another device, such as a smartphone, a tablet computer, a laptop computer, an autonomous vehicle, a robot, etc. Parts of system 400 can be shared with a device within which system 400 is integrated. For example, if system 400 is integrated with an autonomous vehicle, processor 408 can be a processor of the autonomous vehicle and can be used to control operation of system 400.

In some embodiments, system 400 can communicate with any other suitable device, where the other device can be one of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, the other device can be implemented as a control system of another device (e.g., an industrial machine, an autonomous or partially autonomous vehicle, an autonomous or partially autonomous robot, etc.), a smartphone, a wearable computer, a tablet computer, a personal data assistant (PDA), a personal computer, a laptop computer, a digital camera, security camera, outdoor monitoring system, a multimedia terminal, a game console, a peripheral for a game counsel or any other suitable device, any other suitable special purpose device, etc.

In some embodiments, communications system 416 can include any suitable hardware, firmware, and/or software for communicating information over a communication network and/or any other suitable communication networks. For example, communications system 416 can include one or more transceivers, one or more communication chips and/or chip sets, etc., that can be used to establish a wired and/or wireless communication link. In a more particular example, communications system 416 can include hardware, firmware, and/or software that can be used to establish a direct or indirect wired connection and/or a direct or indirect wireless connection, such as a Wi-Fi connection, a cellular connection (e.g., an uplink connection, a downlink connection, or a sidelink connection), a Bluetooth connection, a Bluetooth Low Energy connection, a ZigBee connection, an Ethernet connection, a CAN bus connection, etc. In some embodiments, communications by communications system 416 via a communication link can be carried out using any suitable communication network, or any suitable combination of networks, such as a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard(s), such as CDMA, GSM, LTE, LTE Advanced, 5G NR, etc.), a wired network, etc. In some embodiments, the communication network can include one or more portions of a local area network (LAN), a wide area network (WAN), a public network (e.g., the Internet, which may be part of a WAN and/or LAN), a control area network (CAN), any other suitable type of network, or any suitable combination of networks. In some embodiments, communications system 416 can communicate via any suitable communications links or combination of communications links, such as wired links, fiber optic links, Wi-Fi links, Bluetooth links, cellular links, etc. In some embodiments, communications system 416 can be omitted, and/or can be limited to local communications (e.g., providing an I/O port for service and/or maintenance). For example, if system 400 is incorporated as part of a self-contained device.

In some embodiments, display 418 can be used to present images and/or video generated by system 400, to present a user interface, etc. In some embodiments, display 418 can be implemented using any suitable device or combination of devices, and can include one or more inputs, such as a touchscreen. In some embodiments, display 418 can be omitted. For example, if system 400 is incorporated as part of a device that uses data generated by system 400 to facilitate one or more operations of the device (e.g., a computer vision operation).

In some embodiments, memory 412 can include instructions for causing processor 408 to execute processes associated with mechanisms described herein, such as processes described below in connection with FIGS. 9 to 11.

Note that although mechanisms described herein are generally described as being utilized with SPAD-based detectors, this is one example of a detector technology that for which energy efficiency can be improved using mechanisms described herein. For example, mechanisms described herein can be used to improve energy efficiency of image sensors that include other types of detectors (e.g., other single photon detectors, such as jot-based image sensors, such as the image sensor described in Fossum et al., "The Quanta Image Sensor: Every Photon Counts," Sensors, 16, 1260 (2016), or conventional image sensors, such as conventional CMOS image sensors). In such examples, the number of photon detections may not be closely correlated with energy consumption, as described above in connection with FIG. 1, and mechanisms described herein can be used to selectively reduce energy consumption associated with generating data from particular pixels by inhibiting one or more other sources of energy consumption (e.g., inhibiting readout of particular pixels, inhibiting buffering and/or amplification of data from particular pixels, etc.).

Figures 5, 6:
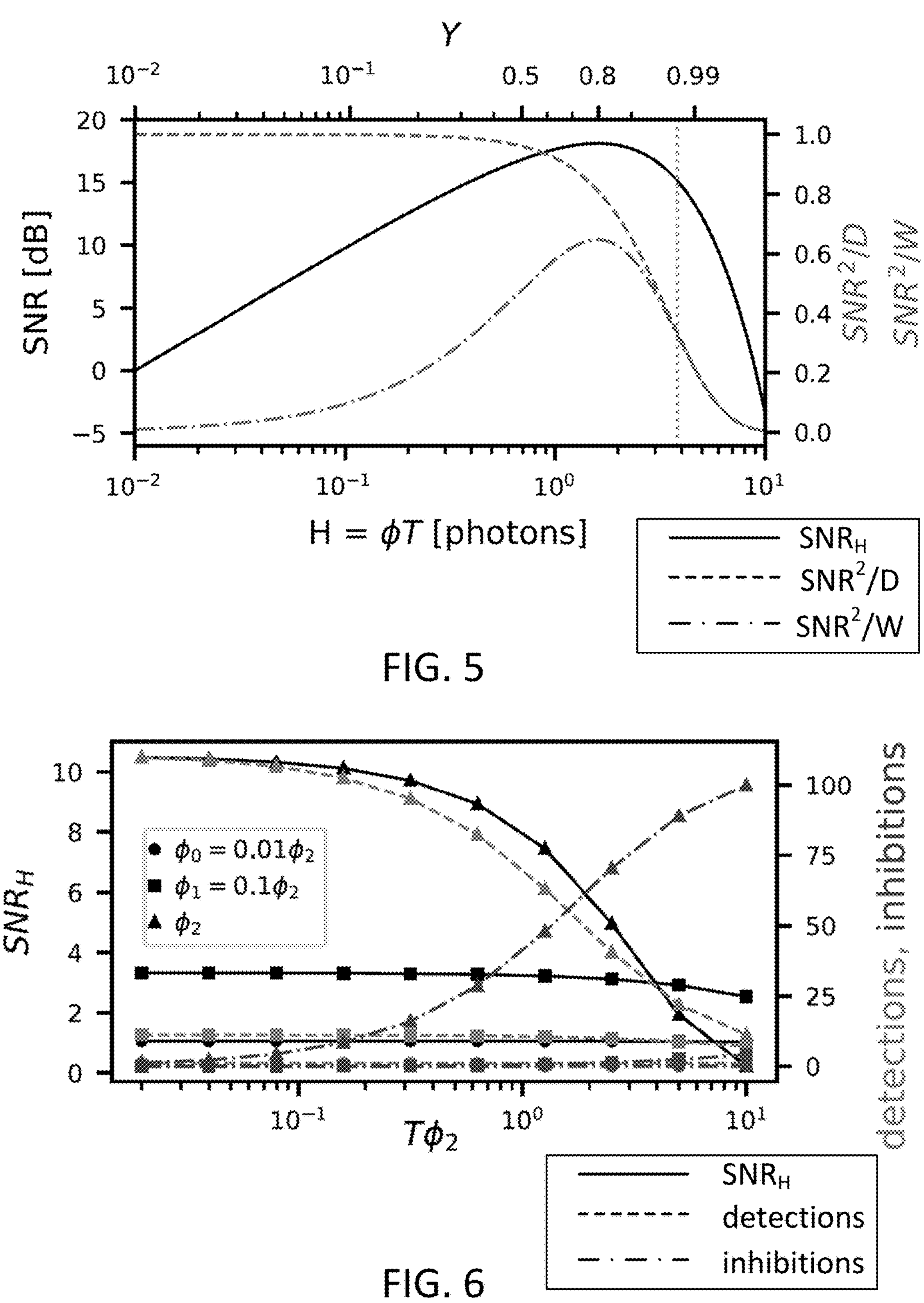
FIG. 5 shows an example of signal-to-noise ratio (SNR), detection efficiency, and measurement efficiency at various exposure levels in accordance with some embodiments of the disclosed subject matter.
FIG. 6 shows an example of SNR, number of photon detections, and number of photon detection inhibitions at various exposure times and flux levels in accordance with some embodiments of the disclosed subject matter.

FIG. 5 shows an example of signal-to-noise ratio (SNR), detection efficiency, and measurement efficiency at various exposure levels in accordance with some embodiments of the disclosed subject matter. In FIG. 5, exposure-referred signal-to-noise ratio ($SNR_H$) in dB (–), detection efficiency (- -), and measurement efficiency (-•-) are plotted versus the average exposure per measurement with W=100 measurements (e.g., over 100 binary frames). The binary rate $Y=1-e^{-H}$ is indicated on the top axis. The vertical dotted line indicates the exposure and the binary rate at which $SNR_H$ degrades by 3 dB from the peak $SNR_H$.

During an exposure time T, a photon flux of $\phi$ results in an average number of photon conversions, or exposure, of $H=\phi T$. The distribution of photon conversions, K, follows the Poisson distribution as $$P(K=k;H)=\frac{H^k e^{-H}}{k!}.$$

During each binary exposure period, a SPAD pixel can be configured to record a '1' if at least one photon was incident during that period, and a '0' otherwise. The probability of detecting at least one photon can be represented as $1-P(K=0;H)=1-e^{-H}$. Accordingly, the SPAD pixel readout in each binary frame is a Bernoulli random variable $Y\sim\text{Bernoulli}(1-e^{-H})$. Multiple exposure time windows, or measurements W, can be recorded to reduce noise with the total number of detections over the W represented as D. As described below in connection with EQS. (1) to (3), D and W can be used to calculate $\hat{Y}$, an estimated pixel readout for a pixel in each frame, and $\hat{Y}$ can be used to calculate $\hat{H}$, an estimated exposure for each pixel. These parameters can be related as $$D\sim\text{Binomial}(W,1-e^{-H}) \tag{1}$$

$$\hat{Y}=\frac{D}{W} \tag{2}$$

$$\hat{H}=-\ln(1-\hat{Y}). \tag{3}$$

The exposure-referred signal-to-noise ratio ($SNR_H$) can be computed as the ratio of the true exposure H and the root-mean-squared error in the estimated exposure $\sqrt{\mathbb{E}[(\hat{H}-H)^2]}$:

$$SNR_H=\frac{H}{\sqrt{\mathbb{E}\left[(\hat{H}-H)^2\right]}}=H\sqrt{\frac{W}{e^H-1}}. \tag{4}$$

At low incident flux, $SNR_H$ is low due to shot noise. The $SNR_H$ improves as the likelihood of a photon detection increases until, in bright light with H>1.6, the $SNR_H$ degrades due to near saturation of the response. The soft saturation with non-zero yet degraded SNR is a unique characteristic of single-photon imagers.

Imaging performance of a SPAD-based image sensor can be evaluated using energy-aware performance metrics described below that are weighted by SPAD avalanche energy costs. For example, a detection efficiency metric $$SNR^2_{H/D}$$

can be defined as the square of SNR normalized by the expected number of detections:

$$SNR^2_{H/D}:=\frac{H^2}{\mathbb{E}[D]}\left(\frac{W}{e^H-1}\right), \tag{5}$$

Where $\mathbb{E}[D]$ is the expected number of detections. Based on EQ. (1), the expected number of detections can be represented as $$\mathbb{E}[D]=W(1-e^{-H}), \tag{6}$$

and the detection efficiency can be represented as:

$$SNR^2_{H/D}=\frac{H^2}{(e^H-1)(1-e^{-H})}. \tag{7}$$

As described above, FIG. 5 shows the $SNR_H$ and the detection efficiency versus the average photon arrivals per frame (H). When H<<1 shot noise dominates with $$SNR^2_{H/D}=1,$$

which is the upper bound of this metric. At larger exposure values, beginning around H≈0.5, the detection efficiency degrades from the limit set by shot noise as the quantization error of Bernoulli sampling adds noise.

A separate constraint is the total number of recharge periods during which a pixel is enabled and can measure either '0' or '1'. This number of measurements (W) may be limited due to the energy to read out a frame, the depth of an in-pixel counter, and/or the maximum allowable sensing latency due to motion blur. As another example of a energy-aware imaging performance metric, a measurement efficiency metric $$SNR^2_{H/W}$$

can be defined as the square of SNR normalized by the number of measurement windows:

$$SNR^2_{H/W} = \frac{H^2}{e^H - 1}. \quad (8)$$

As shown in FIG. 5, measurement efficiency is relatively low at both low and high exposures with the highest efficiency at H=1.59, Y=0.80.

The metrics described above evaluate the SNR of the measurement in terms of the exposure H. However, the binary rate Y, which is related to the exposure through EQ. (3): H=−ln(1−Y), can be used as an alternative representation of the scene. In portions of a scene in which exposures is at or above H≈1 EQ. (3) is unstable, and the exposure estimate may become unbounded. Operating with some pixels at or above H≈1 can be energy efficient because excess photons at bright pixels are inhibited through saturation. Detection efficiency and measurement efficiency for binary rate images can be defined similarly to exposure, and are described in Appendix A. Based on the metrics described herein, a detection at a nearly saturated pixel conveys relatively less information, and can be prioritized for inhibition (e.g., inhibiting such a pixel is unlikely to substantially reduce the total amount of information about the scene included in the image data generated by the image sensor).

In some embodiments, single-pixel efficiency metrics described herein can facilitate the evaluation of various possible inhibition policies. For example, single-pixel efficiency metrics described herein can be used to derive optimal allocations of measurements among the pixels of a sensor matrix that can be compared when constrained by the total number of detections. As a particular example, a measurement allocation that minimizes the mean squared error (MSE) of the binary rate image under a detection constraint distributes measurements to each pixel in proportion to $\sqrt{1-Y}$. Derivations and simulations related to such analytical allocations are described in Appendix A.

FIG. 6 shows an example of SNR, number of photon detections, and number of photon detection inhibitions at various exposure times and flux levels in accordance with some embodiments of the disclosed subject matter. In FIG. 6, $SNR_H$ in dB (–), number of detections (- -), and number of inhibitions (-•-) are plotted versus the average exposure versus the exposure time with total sensing latency, $T_L$, maintained by varying the number of measurements ($W=T_L/T$) at three different flux levels. A vertical slice represents one exposure time of an exposure bracket policy.

The data plotted in FIG. 6 illustrates tradeoffs between detections, inhibitions, and SNR when selecting a single exposure time of a bracketing sequence. TABLE 1 includes data for three specific exposure times of an exposure bracket inhibition policy (e.g., as described below in connection with FIG. 7), including detections, inhibitions, and the contributions of each exposure time to a high dynamic range (HDR) reconstruction. Due to near saturation, detections by the brightest pixel at the longest exposure time(s) have a low weighting for SNR-based HDR reconstruction but still represent 10/25.7=38.9% of the total detections, illustrating a clear opportunity for more advanced inhibition policies to reduce avalanche power. More particularly, TABLE 1 includes results for clocked recharge with exposure bracket results at three pixel fluxes with each exposure time using W=10 of measurements. Flux values are in units of the maximum flux $\phi_2$, wt. is the weighting for HDR reconstruction, D is detections, and I is inhibitions. A bold value indicates an opportunity to improve detection efficiency by using a more advanced inhibition policy.

TABLE 1

| | $T = 0.1/\phi_2$ | | | $T = 1.0/\phi_2$ | | | $T = 10.0/\phi_2$ | | | HDR |
|---|---|---|---|---|---|---|---|---|---|---|
| $\phi[\phi_2]$ | Wt. | D | I | Wt. | D | I | Wt. | D | I | SNR |
| 0.01 | 0.10 | 0.01 | 0.00 | 0.09 | 0.10 | 0.00 | 0.90 | 0.95 | 0.05 | 1.03 |
| 0.10 | 0.32 | 0.10 | 0.00 | 0.14 | 0.95 | 0.05 | 0.85 | 6.32 | 3.68 | 2.62 |
| 1.00 | 0.98 | 0.95 | 0.05 | 0.85 | 6.32 | 3.68 | 0.01 | **10.00** | 88.11 | 2.61 |
| Total | | 1.06 | 0.05 | | 7.37 | 3.73 | | 17.27 | 91.83 | |

FIG. 7 shows an example of various static inhibition policies and various dynamic inhibition policies implemented in accordance with some embodiments of the disclosed subject matter. In FIG. 7, panels (a) to (c) show single-pixel static inhibition policies without computations, and panels (d) and (e) show dynamic inhibition policies with computations. In FIG. 7, arrows represent incoming photons, and arrows with an 'X' are photons for which detection was inhibited under the policy.

FIG. 7, panel (a) shows a single-photon inhibition policy referred to herein as asynchronous recharge with dead time ($\tau_D$). After a photon detection, the bias voltage of a SPAD must be recharged to allow the SPAD to detect a subsequent photon, which is completed between when the photon detection occurs, and the end of the predetermined dead time $\tau_D$. As shown in FIG. 7, panel (a), during dead time $\tau_D$ after each photon detection photon detections are inhibited. The inhibition policy shown in FIG. 7, panel (a) uses only information from a most recent photon detection at a single pixel to determine when photon detections are to be inhibited.

FIG. 7, panel (b) shows a single-photon inhibition policy referred to herein as clocked recharge, in which a recharge period of T sets a window in which 0 or 1 photons can be detected (see, e.g., Morimoto et al., "Megapixel time-gated SPAD image sensor for 2D and 3D imaging applications," Optica, vol. 7, no. 4, pp. 346-354, 2020). As shown in FIG. 7, panel (b), after each photon detection during period T subsequent photon detections within the window are inhibited. The inhibition policy shown in FIG. 7, panel (b) uses only information from a photon detection within one window at a single pixel to determine when photon detections are to be inhibited.

FIG. 7, panel (c) shows a single-photon inhibition policy referred to herein as clocked recharge with exposure brackets in which a recharge period of $T_x$ sets a window in which 0 or 1 photons can be detected, with different length periods (see, e.g., Dutton et al., "High Dynamic Range Imaging at the Quantum Limit with Single Photon Avalanche Diode-Based Image Sensors," Sensors, vol. 18, no. 4, Art. no. 4, April 2018). As with clocked recharge, after each photon detection during period $T_x$ subsequent photon detections within the window are inhibited. The inhibition policy shown in FIG. 7, panel (c) uses only information from photon detections within one window $T_x$ at a single pixel to determine when photon detections are to be inhibited.

FIG. 7, panel (d) shows a single-photon inhibition policy referred to herein as scored spatio-temporal inhibition in which a score, S, can be calculated from values in a spatio-temporal neighborhood within captured binary frames can be used to determine whether future measurements are to be inhibited or permitted. As with clocked recharge, after each photon detection during period T subsequent photon detections within the window are inhibited. Additionally, if S exceeds a threshold, after a window T, photon detections within the next $\tau_H$ windows T are inhibited. The inhibition policy shown in FIG. 7, panel (d) can use information from photon detections at multiple pixels over multiple windows T to determine when photon detections are to be inhibited.

FIG. 7, panel (e) shows a single-photon inhibition policy referred to herein as saturation look-ahead in which when detections $D_x$ within cycle x exceed a threshold, $D_{xM}$, measurements of the next recharge cycle, x+1, and any subsequent recharge cycles within the exposure bracket, are inhibited. For example, in FIG. 7, panel (e), $D_1=2\leq D_{1M}$ and cycle 2 is not inhibited, and $D_2=2>D_{2M}$ which causes cycle 3 (and any subsequent cycles not shown in FIG. 7) to be inhibited.

As with clocked recharge with exposure bracketing, after each photon detection during period $T_x$ subsequent photon detections within the window are inhibited. Additionally, if the number of detections within a cycle x (e.g., a group of adjacent windows of length $T_x$) exceeds a threshold $D_{xM}$, after a final window $T_x$ in the group, photon detections can be inhibited in longer recharge cycles (e.g., at least $T_{x+1}$). The inhibition policy shown in FIG. 7, panel (e) can use information from photon detections over multiple windows $T_x$ to determine when photon detections are to be inhibited.

Some single-photon sensor designs implicitly inhibit photons by setting a maximum count or lengthening the exposure time to limit detections and reduce avalanche energy. Inhibition policies shown in FIG. 7, panels (a) to (c) are examples of such implicit inhibition policies. These architectures are part of a family of inhibition policies that operate at the individual pixel level and do not adapt as a function of the history of photon detections (e.g., as described above in connection with FIG. 7, panels (a) to (c), these policies determine whether to inhibit photon detections based on a single photon detection at a single pixel).

In general, a bias voltage of a SPAD requires recharge after an avalanche-inducing photon detection during which recording a subsequent photon is not possible (sometimes referred to as dead time, $\tau_D$). As shown in connection with FIG. 7, panel (a), asynchronous recharge with dead time can inhibit photons at high exposure, as each detection can inhibit one or more subsequent photon detections that may not be inhibited in a clocked recharge scheme. However, power consumption can be excessive when the average inter-photon arrival interval is shorter than the SPAD dead time. An example of an asynchronous recharge with dead time exposure scheme is described in U.S. Pat. No. 10,616,512.

As shown in connection with FIG. 7, panel (b), clocked recharge can be used as an alternative to asynchronous recharge with dead time that establishes time windows, similar to a conventional exposure time, during which 0 or 1 photon may be detected. After the first photon detection, any subsequent arrivals during the same predefined exposure window are inhibited. The average number of inhibited photons is equal to $$\sum_{k=2}^{\infty}(k-1)P(K=k;H)$$

where P denotes the Poisson probability mass function described above in connection with FIG. 5 and EQS. (1) to (3). At the measurement-limited SNR-optimal exposure H=1.6 there is a Y=0.80 chance of detecting a photon with an average of 0.83 photons inhibited per measurement. With H>>1 the average number of inhibited photons approaches H−1 yet the signal-to-noise ratio degrades because the pixel is nearly saturated. Clocked recharge can considerably reduce power consumption in bright light as compared to asynchronous recharge. Mechanisms described herein can be used to implement more advanced inhibition policies that maintain and extend the power savings of clocked recharge in bright light.

As shown in connection with FIG. 7, panel (c), clocked recharge with exposure brackets uses multiple exposure times to balance constraints on detections and measurements while maintaining SNR over a range of illumination levels. Longer exposure times measure dim pixels with good SNR and limit the detections of bright pixels; short exposure times measure bright pixels with good SNR.

In some embodiments, mechanisms described herein can be used to implement inhibition policies that calculate a spatio-temporal inhibition pattern for each pixel and each frame based on the history of photon frames and patterns. An inhibition pattern can be defined using a binary-valued tensor M, where M(i,j,t)=0 if pixel (i, j) is inhibited in the $t^{th}$ frame, and M(i,j,t)=1 otherwise. For example, in FIG. 2, the inhibition pattern for frame N includes a 0 for the upper left pixel, upper right pixel, and lower left pixel, and a 1 elsewhere, whereas the inhibition pattern calculated based on frames N−2 to N (i.e., the inhibition pattern for frame N+1) has a 0 at each pixel in the left column, the center pixel, and the lower right pixel.

In some embodiments, all spatio-temporal voxels (e.g., a voxel can be a single pixel over multiple frames) can be considered not inhibited (e.g., each value in an initial inhibition tensor M(i, j, 0) can be set to 1) by default until on-sensor calculations modify the state of the inhibition pattern. A binary photon cube can be defined as F(i,j,t)=1 if a photon is detected at pixel location (i, j) in the $t^{th}$ frame. If the pixel is inhibited during the $t^{th}$ frame (e.g., if M(i,j,t)=0), then F(i,j,t)=0 with probability 1.

In some embodiments, components of a photon inhibition processing layer can include a set of binary frames, F, and an inhibition pattern M, as shown in FIG. 2. For ease of on-sensor implementation, inhibition policies that operate on small local spatio-temporal neighborhoods of fixed sizes are described herein, though mechanisms described herein can be used in connection with larger and/or more complex inhibition policies. Additionally, local arithmetic and boolean computations and comparison operations can be utilized for implementing inhibition policies, consistent with current in-pixel computational capabilities.

In some embodiments, an inhibition policy consistent with the policy shown in FIG. 7, panel (d) can be implemented using mechanisms described herein. For example, mechanisms described herein can be used to implement an on-sensor calculation approach that operates in a streaming fashion as frames accumulate to calculate an inhibition score, S (e.g., for each pixel, or a group of pixels), as the result of a spatio-temporal filter of the binary frames and inhibition pattern. The score at each pixel can be calculated as $$S(i, j, t) = K * [(2F(i, j, t) - 1) \cdot M(i, j, t)] \quad (9)$$

which can apply a spatio-temporal filtering kernel, K, of dimensions W, H, L to a ternary representation of the pixel result (1, 0, or −1 for a detection, a disabled pixel, or a measurement that does not detect a photon, respectively). The kernel K can typically be separated into spatial and temporal components as $K=K_s \otimes K_t$ with dimensions W×H×1 and 1×1×L, respectively. After each binary frame, score S for each pixel can be compared to a threshold η, and the pixel can be inhibited for the subsequent $\tau_H$ frames if the score exceeds the threshold, which can be represented as M(i,j,t')=0 for $\{t' | t+1 \le t' \le t+1+\tau_H\}$ if S(i,j,t)>η. Note that a score S(i,j,t) can be calculated as a sum of scores for each frame. For example, the spatial filter ($K_s$) can be calculated at pixel (i, j) using data from pixels in an W×H group of pixels including pixel (i, j) in a first frame to generate a first sub-score (e.g., $S^*_1$), can be applied to pixel (i, j) to data from pixels in the W×H group of pixels including pixel (i, j) in a second frame to generate a second sub-score (e.g., $S^*_2$), etc., and a score S(i,j,t) for the $t^{th}$ frame can be a sum of sub-scores for the $t^{th}$ frame and preceding (L−t) frames combined using the temporal filter ($K_t$) (e.g., if $K_t$ is an averaging filter $$S(i, j, t) = \sum\nolimits_{n=t-(L-1)}^{n=t} S^*_n.)$$

In some embodiments, scored spatio-temporal filtering can be used to implement many different particular inhibition policies (e.g., based on weights used in filter K), which can be well suited to different imaging tasks and/or applications. For example, scored spatio-temporal filtering can be used to implement a single-pixel dead time inhibition policy that uses a spatial kernel $K_s$ of dimensions 1×1, and a temporal kernel $K_t$ (e.g., with dimension 1×1×L, L≥2), which can exhibit some of the same characteristics of the dead time of a passive SPAD (e.g., an asynchronous SPAD) without influence from neighboring pixels. Unlike a SPAD recharge generated dead time (e.g., dead time $\tau_D$), the temporal kernel can be extended (e.g., to any suitable number of frames long) to establish a rate threshold for inhibition with reduced quantization noise.

As another example, scored spatio-temporal filtering can be used to implement a local spatio-temporal averaging inhibition policy that uses a spatio-temporal average to estimate the local photon rate, which can reduce the impact of noise on inhibition pattern. Single binary frames are inherently noisy. Additionally, as shown in FIG. 7, panel (d), the stochastic nature of binary frames smooths the distribution of measurements versus pixel flux. Discontinuities ("dips") in SNR versus photon flux are undesirable due to the potential for artifacts.

As yet another example, scored spatio-temporal filtering can be used to implement an edge enhancement inhibition policy. In such an example, pixels can be inhibited if a local neighborhood has little spatial variation in photon rate. This can be achieved, for instance, using a spatial filter $K_s$ in EQ. (9) which can act like a Laplacian filter. Such a strategy can enhance the fidelity of edges in the image while focusing fewer resources on regions of the scene with more uniform portions of the scene.

In some embodiments, an inhibition policy consistent with the policy shown in FIG. 7, panel (e) can be implemented using mechanisms described herein. For example, mechanisms described herein can be used to implement an on-sensor calculation approach that combines exposure brackets and calculation-based inhibition for a lightweight single-pixel inhibition policy (e.g., a saturation look-ahead inhibition policy). In some embodiments, saturation look-ahead inhibition policy can proceed as a sequence of cycles (indexed by i) of binary frames where each binary frame within each cycle uses the same exposure time (e.g., binary frames in the first cycle can all have exposure time $T_1$, binary frames in the second cycle can all have exposure time $T_2$, etc.). Cycle exposure times $T_x$ can progressively increase ($T_1<T_2<T_3$ . . . ) such that measurements taken in an earlier cycle can predict near saturation at longer exposure times and inhibit subsequent cycles. For example, mechanisms described herein can be configured to inhibit all cycles beyond cycle x if an estimate of the SNR for exposures in subsequent cycles (e.g., cycle x+1) is at least 3 dB below the peak (e.g., to the right of the dashed vertical line in FIG. 5). In such an example, an exposure level threshold for inhibition can be adjusted based on the relative importance of power consumption, sensing latency, and SNR.

Figure 8:
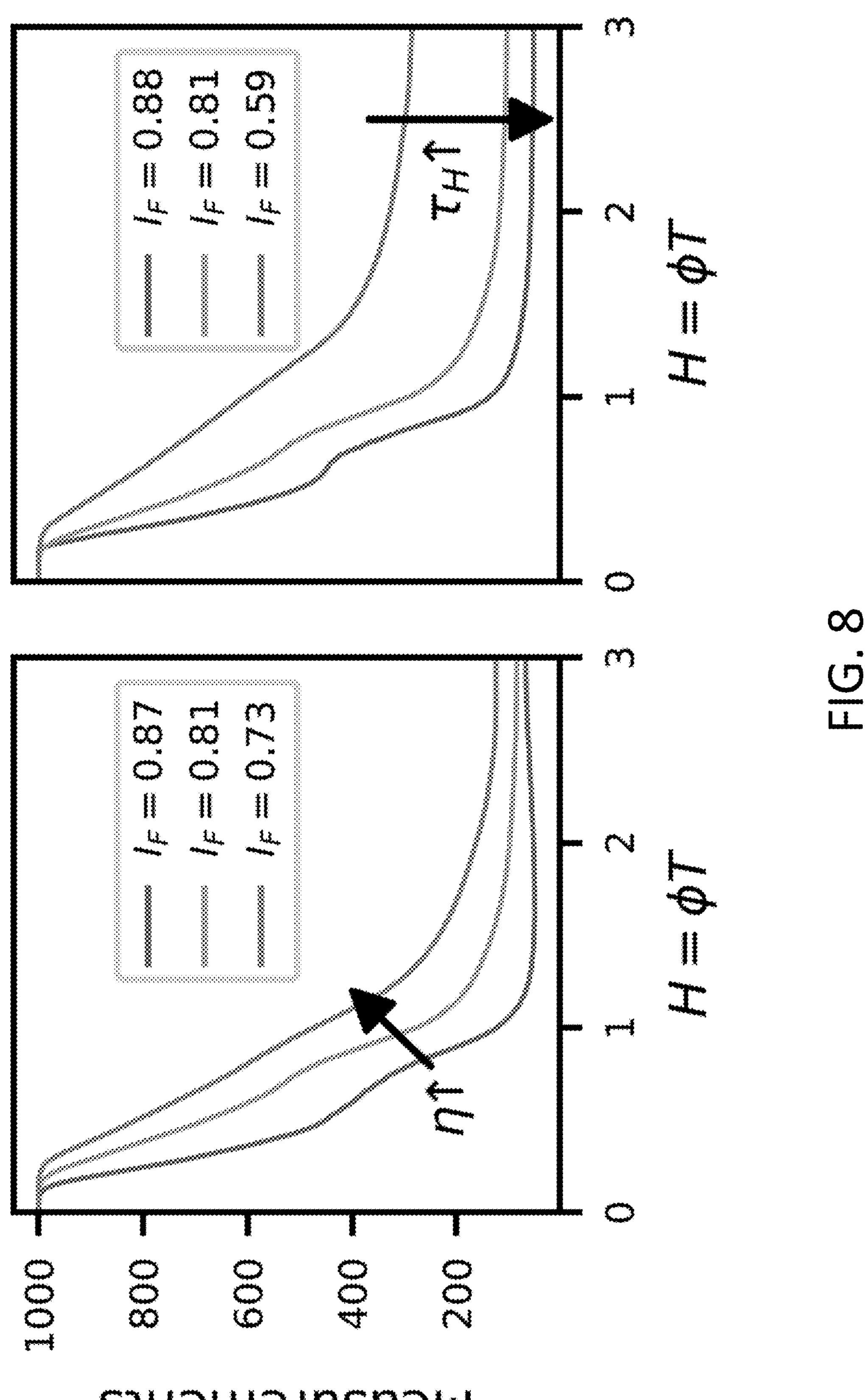
FIG. 8 shows an example of a total number of photon detections at various exposure levels as an inhibition threshold and hold-off time are varied in accordance with some embodiments of the disclosed subject matter.

FIG. 8 shows an example of a total number of photon detections at various exposure levels as an inhibition threshold and hold-off time are varied in accordance with some embodiments of the disclosed subject matter. In some embodiments, on-sensor inhibition policies can facilitate tuning for different applications and/or flux levels. For example, left panel demonstrates how the distribution of uninhibited measurements (W) versus the pixel exposure depends upon the inhibition threshold η for a sequence of 1000 binary frames. As shown, a smaller threshold η more aggressively inhibits photons. The right panel demonstrates the impact of the hold-off time, $\tau_H$, on the number of measurements allocated to the brightest pixels. The legend indicates the fraction of photons inhibited as IF, which is the total fraction of incident photons that are inhibited over the whole frame, aggregated over all exposure levels. As shown, at very low light levels (e.g., near H=0), very few frames are inhibited, and as the brightness increases, measurements are inhibited in an increasing fraction of the frames.

As shown in FIG. 8, decreasing η and increasing $\tau_H$ can be used to attain more aggressive inhibition with a larger fraction of photons being inhibited. The binary rate of each pixel can be estimated as the ratio of detections to (uninhibited) measurements as $\hat{Y}(i,j,t)=\Sigma_{t'} F(i,j,t')/\Sigma_{t'} M(i,j,t')$. This calculation requires a record of the inhibition history which can be accumulated by an in-pixel counter or recreated in a downstream processor if all binary frames are read out (as the inhibition pattern that was applied can be deterministically determined based on the values in the pixels).

Figure 9:
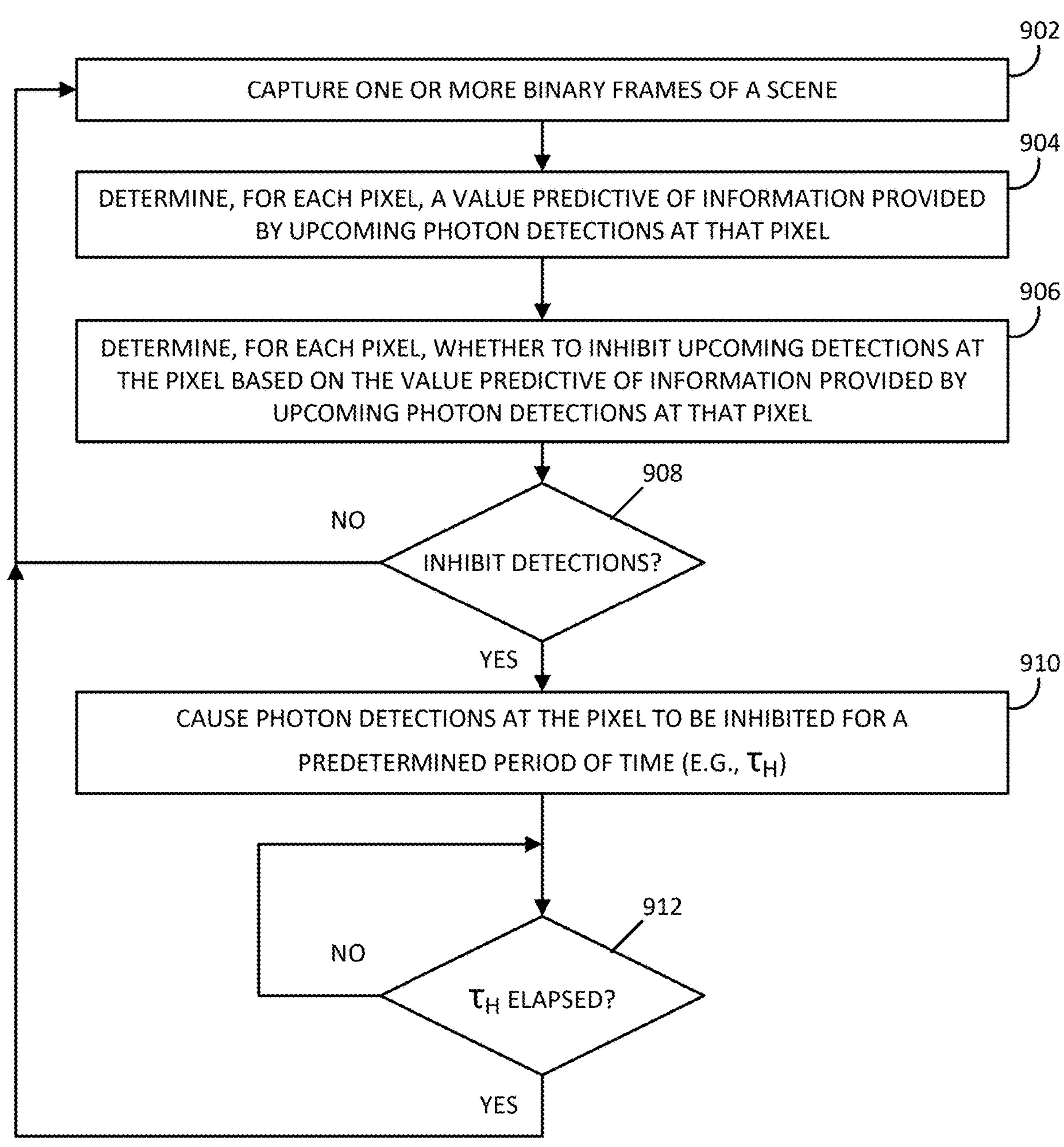
FIG. 9 shows an example of a process for selectively inhibiting photon detections by a single-photon detector in accordance with some embodiments of the disclosure.

FIG. 9 shows an example of a process 900 for selectively inhibiting photon detections by a single-photon detector in accordance with some embodiments of the disclosure.

At 902, process 900 can capture (and/or receive) one or more binary frames of a scene using any suitable technique or combination of techniques. For example, as described above in connection with FIGS. 2, 4, and 7, process 900 can cause a SPAD-based image sensors to detect arrival of a first photon at SPAD pixels in an array of SPAD pixels within a particular period of time (e.g., within a static-length exposure time T or a variable-length exposure time $T_x$), or to count a number of photon arrivals at SPAD pixels in an array of SPAD pixels within a particular period of time (e.g., asynchronously over a predetermined period of time, as described in U.S. Pat. No. 10,616,512).

Additionally or alternatively, in some embodiments, process 900 can capture (and/or receive) one or more multi-bit frames of a scene using any suitable technique or combination of techniques. For example, process 900 can capture and/or receive a sequence of non-binary low bit depth frames (e.g., a 2 bit frame, a 3 bit frame, 4 bit frame, etc.). In a more particular example, a multibit (e.g., 2 bit, 3 bit, 4 bit, etc.) frame can include a value, at each pixel, corresponding to a sum of multiple binary frames. In such an example, a 2 bit frame can be a sum of up to four binary frames, a 3 bit frame can be a sum of up to eight binary frames, etc. As another example, process 900 can capture and/or receive a sequence of averaged low bit depth frames. In such an example, data from each pixel location in a frame can be averaged across multiple frames (e.g., two frames, four frames, eight frames, or any other suitable number of frames). In a particular example, an average of eight frames can be calculated by, at each pixel location, determining a sum of pixel detections (e.g., for 1 bit frames, a value from 0 to 8), and dividing by 8. Note that multibit frames can include information from multiple binary frames, and an averaged low bit depth frame can be generated from one or more multibit frames. For example, data from four binary frames can be used to generate a 2 bit frame, and two 2 bit frames can be used to generate an average of eight frames by determining a sum of pixel values in the two frames, and dividing by 8.

Additionally or alternatively, in some embodiments, process 900 can capture (and/or receive) one or more binary frames or conventional multi-bit frames of a scene generated by an array of non-SPAD-based pixels (e.g., a conventional CMOS image sensor, a jot-based CMOS image sensor, etc.) using any suitable technique or combination of techniques. For example, process 900 can capture and/or receive an image generated by an image sensor implemented with conventional and/or jot pixels. In such an example, the image sensor can generate a conventional multi-bit image (e.g., an 8 bit, or higher, value indicative of brightness of a portion of a scene from which light is captured by the pixel), a binary frame (e.g., indicative of whether a single photon was detected by a jot sensor during an exposure time), or a non-binary frame (e.g., indicative of a number of single photons detected by a jot sensor during a series of exposure times).

At 904, process 900 can determine, for each pixel (or group of pixels), a value predictive of information provided by upcoming photon detections at that pixel. In some embodiments, process 900 can determine the value predictive of information provided by upcoming photon detections at that pixel using any suitable technique or combination of techniques. For example, process 900 can calculate a score S for the pixel based on a spatio-temporal filter with kernel K (e.g., as described above in connection with FIG. 7, panel (d)). Note that in such an example, score S can be based on photon detections at a single pixel over a predetermined number of frames (e.g., using a kernel K with a spatial kernel $K_s$ of dimension 1×1×1 and a temporal kernel $K_t$ of dimension 1×1×L, L≥2), or based on photon detections at multiple pixels over a predetermined number of frames (e.g., using a kernel K with a spatial kernel $K_s$ of dimension W×H×1, where W×H>1, and a temporal kernel $K_t$ of dimension 1×1×L, L≥1). In some embodiments, any suitable filter kernel or combination of filter kernels can be used to determine score S, such as filter kernels described herein and in Appendix A. For example, different filter kernels can be used based on a computer vision task to be performed. Additionally, in some embodiments, different filter kernels can be used at different times (e.g., based on a difference in application at different times). Note that process 900 can calculate scores based on frames with the same exposure time (e.g., as described in connection with FIG. 7, panels (b) and (d)), or based on frames with the different exposure times (e.g., as described in connection with FIG. 7, panels (c) and (e)). In some embodiments, a filter kernel K, a threshold(s) $\eta$, a deadtime $\tau_H$, and/or any other suitable parameters can be tuned for a particular computer vision task (or combination of tasks), such as edge detection, object detection, semantic segmentation, image classification, object tracking, odometry, optical flow, motion estimation, simultaneous localization and mapping (SLAM), camera pose-estimation, surveillance, etc. For example, a size of filter kernel K (e.g., values of W, H, and/or L) and/or weights of the filter kernel can be tuned manually and/or using any suitable automated training process. In such an example, inhibition policies with different sizes and/or weights of filter kernel K can be used to generate inhibited data (e.g., from an appropriate set of uninhibited training data, such as training data the includes a scene and/or conditions associated with the computer vision task), and performance of the computer vision task using inhibited data generated with the difference inhibition policies can be evaluated to determine which filter kernel size and/or weights produces desirable results (e.g., similar performance of the task compared to performing the task with uninhibited data, and reduced energy consumption; somewhat degraded performance of the task compared to performing the task with uninhibited data, and further reduced energy consumption; a maximized reduction in energy consumption with an acceptable level of performance). As another example, a value of a threshold(s) $\eta$ and/or a deadtime $\tau_H$ can be tuned for a particular computer vision task (or combination of tasks). In some embodiments, training can be performed while varying multiple parameters, such that multiple different combinations of K, $\eta$, and/or $\tau_H$ can be evaluated. In some embodiments, any suitable automated training techniques can be used to tune K, $\eta$, and/or $\tau_H$ to a particular computer vision task, such as machine learning training techniques (e.g., that utilize a loss function, and gradient descent, utilizing a numerical search over a range of values, etc.), which can be constrained using any suitable constraints (e.g., limiting the size and/or weights of K, values of $\eta$ and/or $\tau_H$ to a set of values that can be implemented using light-weight calculations on-sensor on a SPAD-sensor).

In some embodiments, different kernels can be applied to different pixels. For example, a pixel at or near an edge of the sensor can have fewer than W×H neighboring pixels. In such an example, a filter kernel used in connection with such a pixel can have weights associated with locations at which there is no neighboring pixel set to zero. As another example, a pixel at or near an edge of the group of pixels can have fewer than W×H neighboring pixels. In such an example, a filter kernel used in connection with such a pixel can have weights associated with locations at which there is no neighboring pixel in the group set in to zero. Additionally, multiple kernels can be applied to each pixel (e.g., to determine multiple scores, which can be used together at the same time, and/or individually at different times).

As another example, process 900 can determine a number of photon detections that have occurred within a particular exposure time cycle at a particular pixel (e.g., as described above in connection with a saturation look-ahead inhibition policy, and FIG. 7, panel (e)). For example, process 900 can determine a number of detections $D_x$ within a cycle x of a set of exposure brackets.

Additionally or alternatively, in some embodiments, at 904, process 900 can determine, for each pixel (or group of pixels), a value predictive of information provided by upcoming exposures of that pixel (e.g., rather than information provided by individual photons). For example, if mechanisms described herein are utilized in connection with a conventional CMOS imager, a score S can be determined based on analog values (e.g., an analog voltage) and/or multi-bit digital values (e.g., an 8 bit, or higher, value indicative of brightness measured by the pixel) output by the pixels within an W×H group of pixels including the pixel. In such an example, F(i,j,t) can be values indicative of measured brightness (e.g., rather than a ternary representation of whether a pixel was detected, as described above in connection with EQ. (9)). Note that in the context of a conventional CMOS imager, mechanisms described herein can be implemented on-sensor and/or off-sensor, as a conventional CMOS imager generally generates much less data than the amount generated by a SPAD-based image sensor during the same total exposure time.

At 906, process 900 can determine, for each pixel (or group of pixels), whether to inhibit upcoming photon detections at the pixel based on the value predictive of information provided by upcoming photon detections at that pixel. In some embodiments, process 900 can determine that upcoming photon detections are to be inhibited at that pixel using any suitable technique or combination of techniques. For example, process 900 can determine whether a score S (or multiple scores) associated with the pixel calculated at 904 satisfies a threshold $\eta$ (e.g., whether $S>\eta$, or $S\geq\eta$) or multiple thresholds (e.g., as described below in connection with FIG. 14). As another example, process 900 can determine whether a number of detections $D_x$ within a cycle x satisfies a threshold $D_{xM}$ associated with cycle x (e.g., set based on a number of detections indicative of an SNR in cycles with longer exposure times being at least 3 dB below a peak SNR). As yet another example, if mechanisms described herein are utilized in connection with a conventional CMOS imager, process 900 can determine whether a signal level $D'_x$ for a particular frame within a cycle x (e.g., which can include a single frame) satisfies a threshold $D'_{xM}$ associated with cycle x (e.g., set based on a signal level indicative of an SNR in cycles with longer exposure times being at least 3 dB below a peak SNR).

If process 900 determines that upcoming photon detections at the pixel are not to be inhibited ("NO" at 908), process 900 can return to 902, and can capture one or more additional binary frames.

Otherwise, if process 900 determines that upcoming photon detections at the pixel are to be inhibited ("YES" at 908), process 900 can move to 910.

At 910, process 900 can cause photon detections at the pixel to be inhibited for a predetermined period of time. In some embodiments, process 900 can inhibit photon detections at a pixel using any suitable technique or combination of techniques. For example, in some embodiments, process 900 can control a switch (or other suitable component(s)) and/or quenching circuit to inhibit recharge of a SPAD pixel and/or inhibit avalanche of the SPAD pixel. In such an example, process 900 can control a switch (e.g., a transistor) that provides a connection between a bias voltage and a cathode of the SPAD to inhibit the bias voltage from returning to a bias voltage above the breakdown voltage of the SPAD (and/or cause the bias voltage to drop below the breakdown voltage of the SPAD). In a particular example, process 900 can set an inhibition pattern M(i,j,t') for one or more upcoming frames such that detections by the SPAD are inhibited for one or more upcoming frames (e.g., M(i,j,t')=0 for $\{t'|t+1\leq t'\leq t+1+\tau_H\}$, or M(i,j,t')=0 for all $\{'|t\in T_x<t'\leq t\in T_{N>x}\}$ when $D_x>D_{xM}$). In such an example, process 900 can cause photon detections by the pixel to be inhibited for a predetermined period of time (e.g., $\tau_H$), or for cycles of an exposure bracketing scheme with longer exposure times (e.g., for all $T_y$ where y>x). In another more particular example, process 900 can set the inhibition pattern to inhibit detections in response to determining that upcoming photon detections at the pixel are to be inhibited (e.g., when $D_x>D_{xM}$), and can reset the inhibition pattern to permit detections after the exposure bracketing sequence is complete (e.g., when the longest exposure bracket cycle has been completed, and before a shorter exposure bracket cycle, such as for $T_1$, has started).

As another example, process 900 can control a switch (or other suitable component(s)) to inhibit power consumption by a CMOS pixel during an upcoming frame(s) (e.g., of an exposure bracketing sequence in a conventional CMOS, in a sequence of binary frames in a jot-based sensor, etc.). As described above in connection with FIG. 1, power consumption by conventional CMOS image sensors is relatively consistent across a broad range of flux values. In a CMOS image sensor, power consumption to generate the signal indicative of brightness at the pixel is relatively small, and power consumption is dominated by operations related to amplification, analog to digital conversion, and/or readout (e.g., power is consumed by amplifiers, analog-to-digital converters, column buffers, a frame buffer, etc.). In such an example, in addition to, or in lieu of, inhibiting detection of photons by pixels, process 900 can inhibit one or more operations related to readout of the pixel from being performed (e.g., inhibiting amplification, ADC, readout, etc.).

In some embodiments, a signal that controls such a switch (or other component) can be provided by a device and/or component that stores a state of the inhibition pattern for a particular upcoming frame(s), and/or stores a time at which the pixel is to be inhibited or a time at which the pixel is to be permitted to detect photons. In some embodiments, process 900 can store a value(s) in the device and/or component that reflects the inhibition pattern for an upcoming frame(s). For example, process 900 can set a value(s) in memory associated with the pixel to be inhibited (e.g., configured to store at least $\tau_H/T$ values), such as values associated with frames $[t, t+1, \ldots, t+\lfloor\tau_H/T\rfloor]$. In such an example, photon detections at the pixel can be inhibited or permitted based on a value in the memory corresponding to a current frame (e.g., a value of 1 can permit detections, and a value of 0 can inhibit detections). In such an example, after exposure time T has elapsed, values in memory can be updated such that the value in memory for the next frame (e.g., frame t+1) controls whether photon detections are inhibited during the next frame. In a particular example, if process 900 determines that photon detections are to be inhibited for dead time $\tau_H$ for a particular pixel, process 900 can set values in a memory associated with the particular pixel (e.g., to [M(i,j,t), 0, . . . , 0]), and when the current exposure time T has elapsed, the values can be updated (e.g., to [0, 0, . . . , 1]). In some embodiments, such a memory can be implemented using shift registers that track current values of the inhibition pattern for the upcoming frames.

As another example, process 900 can set a time value (e.g., in a number of frames, a number of exposures, a clock value when detections are to be permitted, etc.) in memory associated with the pixel to be inhibited. In such an example, photon detections at the pixel can be inhibited or permitted based on whether the time has elapsed. In a particular example, if process 900 determines that photon detections are to be inhibited for dead time $\tau_H$ for a particular pixel, process 900 can set a counter to a value corresponding to the deadtime (e.g., ~[$\tau_H$/T] for equal length exposure times), and the counter can be decremented after each frame or exposure time. In such an example, when the counter reaches zero, detection by the pixel can be permitted. As another more particular example, if process 900 determines that photon detections are to be inhibited for dead time $\tau_H$ for a particular pixel, process 900 can store a value corresponding to a current clock value plus the deadtime. In such an example, when the current clock value exceeds the stored value (e.g., determined using a comparator), detection by the pixel can be permitted.

As yet another example, process 900 can set a value in memory (e.g., a flag indicating whether photon detections are to be inhibited for the pixel) associated with the pixel to be inhibited, and the value can be reset after an exposure bracketing sequence is completed. In a particular example, if process 900 determines that photon detections are to be inhibited in accordance with a saturation look-ahead inhibition policy (e.g., after a cycle x for which $D_x > D_{xM}$), process 900 can set a value to indicate that detections are to be inhibited (e.g., to 0, indicating that detections by the pixel are to be inhibited). In such an example, after a last exposure cycle (e.g., a longest exposure cycle) is completed, process 900 can reset the value (e.g., to 1, indicating that detections by the pixel are to be permitted).

At 912, process 900 can determine whether the predetermined period of time has elapsed. In some embodiments, process 900 can determine whether the predetermined period of time has elapsed using any suitable technique or combination of techniques. For example, as described above in connection with 910, process 900 can determine whether a dead time $\tau_H$ has elapsed based on a value retrieved from memory (e.g., a value output from a shift register), which can indicate whether detections by the pixel are to be inhibited in the next frame.

As another example, as described above in connection with 910, process 900 can determine whether a dead time $\tau_H$ has elapsed based on whether a counter used to track the deadtime has reached zero. As yet another example, as described above in connection with 910, process 900 can determine whether a dead time $\tau_H$ has elapsed based on whether a current clock has reached (or exceeded) a time representing the deadtime. As still another example, as described above in connection with 910, process 900 can determine whether an inhibition flag has been reset.

If process 900 determines that the predetermined period of time has not elapsed ("NO" at 912), process 900 can continue to determine whether the predetermined time has elapsed at 912.

Otherwise, if process 900 determines that the predetermined period of time has elapsed ("YES" at 912), process 900 can return to 902. In some embodiments, process 900 can continue to capture and/or receive frames at 902 until a predetermined number of frames have been captured and/or received (e.g., a number of frames corresponding to a single reconstructed image). Additionally or alternatively, process 900 can continue to capture and/or receive frames at 902 until a signal is received to stop capturing images (e.g., when a virtual or physical shutter button is actuated to stop acquisition of video data). Alternatively, in some embodiments, process 900 can continue to capture and/or receive frames at 902 indefinitely (e.g., as long as power is provided to a device executing process 900, such as in some security cameras, industrial cameras, etc.).

Figure 10:
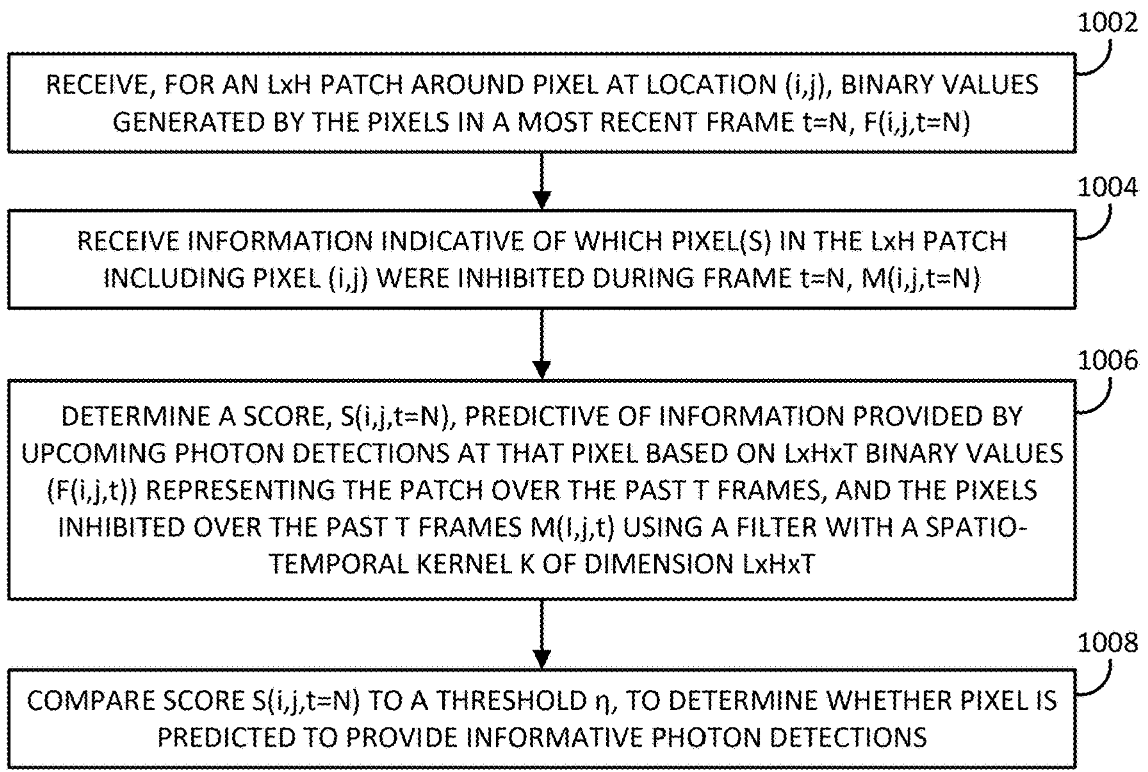
FIG. 10 shows an example of a process for determining whether to inhibit upcoming detections at a particular pixel in accordance with some embodiments of the disclosure.

FIG. 10 shows an example of a process 1000 for determining whether to inhibit upcoming detections at a particular pixel in accordance with some embodiments of the disclosure. In some embodiments, process 1000 can be used to determine whether to inhibit upcoming detections at a particular pixel (e.g., as described above in connection with 906 of FIG. 9).

At 1002, process 1000 can receive, for each pixel in a patch (e.g., a W×H patch) that includes the pixel for which an inhibition determination is to be made (e.g., a pixel at location (i, j)), a value(s) (e.g., a binary value) generated by the pixel in a most recent frame (or frames). For example, process 1000 can receive a set of values (e.g., F(i,j,t=N)), which can include a binary value for each pixel in a W×H patch that includes a pixel at location (i,j) (e.g., which may be a center pixel in the patch) indicative of whether a pixel was detected by that pixel in the most recent frame. Additionally or alternatively, in some embodiments, process 1000 can receive a non-binary value for each pixel (e.g., indicative of a number of pixel detections over a set of frames, indicative of brightness detected at a conventional CMOS pixel, etc.).

In some embodiments, as described above in connection with FIG. 2, neighboring pixels can be configured to communicate values indicative of photon detections to one or more neighboring pixels. For example, all pixels in the array can be configured to communicate a value corresponding to a current/most recent frame to each neighboring pixel. As another example, pixels in a group of pixels (e.g., an W×H patch of pixels) can be configured to communicate a value corresponding to a current/most recent frame to each neighboring pixel within the group of pixels (e.g., such pixels may not be configured to communicate with pixels that are not in the same group of pixels).

At 1004, process 1000 can receive information indicative of which pixel(s) in the patch, including the pixel for which an inhibition determination is to be made, were inhibited during the most recent frame. For example, process 1000 can receive a set of values (e.g., M(i,j,t=N)), which can include a binary value for each pixel in the W×H patch indicative of whether the pixel was inhibited from detecting photons during the most recent frame.

In some embodiments, neighboring pixels can be configured to communicate values indicative of whether photon detections were inhibited to one or more neighboring pixels. For example, all pixels in the array can be configured to communicate an inhibition value corresponding to a current/most recent frame to each neighboring pixel, or pixels in a group of pixels can be configured to communicate an inhibition value corresponding to a current/most recent frame to each neighboring pixel within the group of pixels.

At 1006, process 1000 can determine a score that is predictive of information provided by an upcoming photon detection(s) at the pixel based on detections within the patch over a previous predetermined number of binary frames, and which pixels in the patch were inhibited over the previous predetermined number of binary frames using a spatio-temporal filter with a kernel K. As described above in connection with FIG. 7, process 1000 can generate a sub-score for the current frame (e.g., $S^*(i,j,t=N)$) using a spatial kernel $K_s$ (e.g., where $K=K_s \otimes K_t$), and can determine a score for the current frame (e.g., $S(i,j,t=N)$) based on a sum of sub-scores associated with a most recent T frames (e.g., $S(i,j,t=N)=S^*(i,j,t=N)+S^*(i,j,t=N-1)+ \ldots +S^*(i,j,t=N-T)$). In some embodiments, a current and previous sub-scores can be stored in memory (e.g., implemented using shift registers), can be added after each frame, and can be updated (e.g., to replace an oldest sub-score with a newest sub-score) after each frame. As described above in connection with FIGS. 7 and 9 (and in Appendix A), in some embodiments, a sub-score and/or score (or multiple sub-scores or scores) can be calculated using any suitable kernel or kernels.

At 1008, process 1000 can compare a score(s) for the most recent frame (e.g., $S(i,j,N)$) to a threshold (e.g., $\eta$) to determine whether the pixel is predicted to provide informative photon detections. In some embodiments, process 1000 can use any suitable technique or combination of techniques to determine whether the score satisfies the threshold (e.g., $S(i,j,N) \succ \eta$, $S(i,j,N) \geq \eta$, etc.), such as techniques described above in connection with FIGS. 7 and 9.

In some embodiments, a result of the comparison at 1008 can be used (e.g., at 906) to determine whether to inhibit upcoming photon detections at the pixel.

Figure 11:
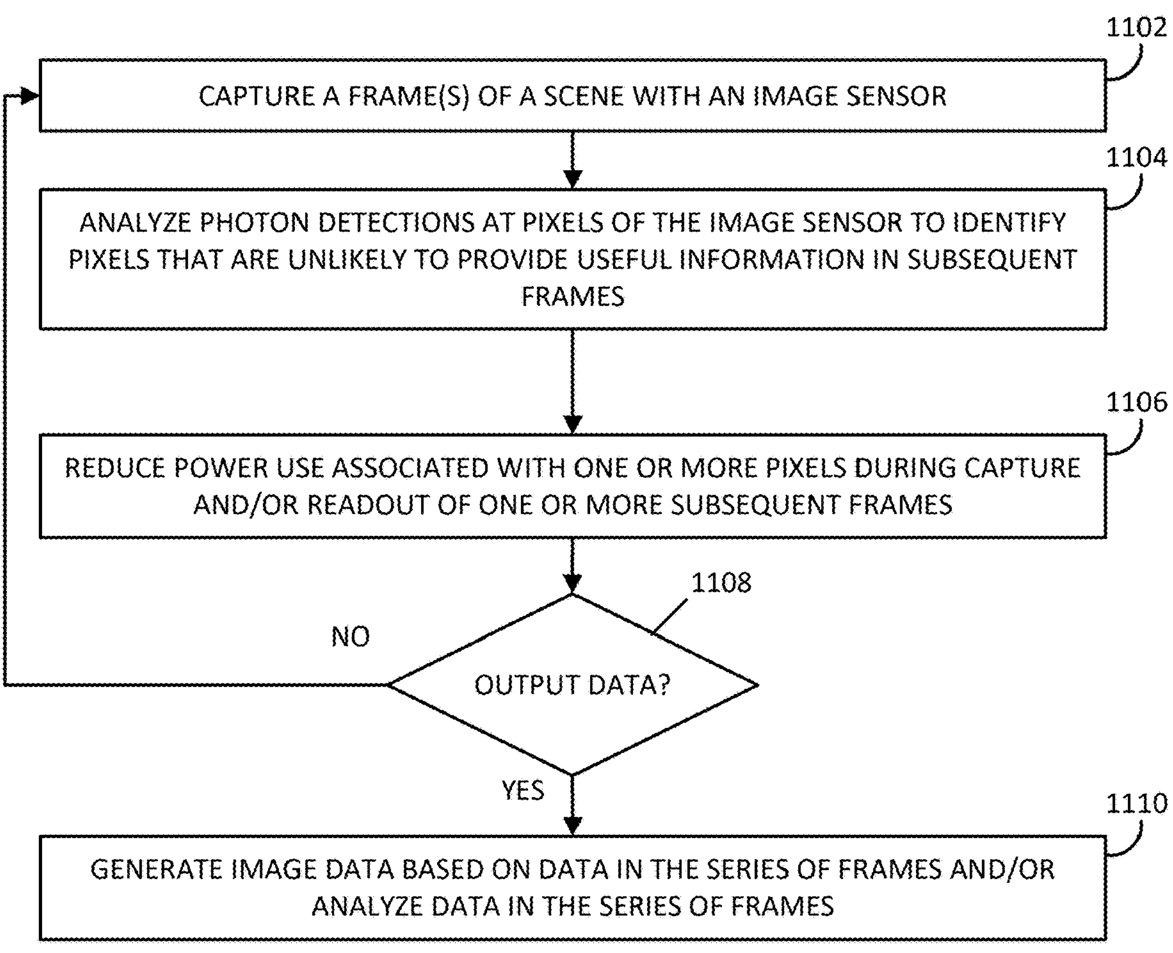
FIG. 11 shows an example of a process for generating image data with improved energy efficiency in accordance with some embodiments of the disclosure.

FIG. 11 shows an example of a process 1100 for generating image data with improved energy efficiency in accordance with some embodiments of the disclosure.

At 1102, process 1100 can capture a frame or multiple frames of a scene with an image sensor. In some embodiments, process 1100 can capture a frame(s) of a scene using any suitable image sensor(s), such as an image sensor implemented with SPAD-based detectors, jot-based detectors, conventional CMOS pixels, infrared detectors, CMOS-based x-ray sensors, —any other suitable detection technology, or any suitable combination thereof.

At 1104, process 1100 can analyze photon detections and/or brightness measurements at pixels of the image sensor to identify whether a particular pixel(s) are unlikely (or likely) to provide useful information in one or more subsequent frames. In some embodiments, process 1100 can use any suitable technique or combination of techniques to determine identify whether a particular pixel or group of pixels is unlikely (or likely) to provide useful information in subsequent frames (e.g., whether the subsequent frames are likely to have at least a threshold SNR, such as an SNR that is within 3 dB of a peak SNR of the image sensor), such as techniques described above in connection with FIGS. 7 and 9.

At 1106, process 1100 can reduce power use associated with one or more pixels during capture and/or readout of one or more subsequent frames. In some embodiments, process 1100 can use any suitable technique or combination of techniques to reduce power consumption associated with one or more pixels that are unlikely to provide useful information in one or more subsequent frames, such as techniques described above in connection with FIG. 9. For example, process 1100 can inhibit a SPAD-based pixel from detecting a photon(s) in an upcoming frame(s). As another example, process 1100 can inhibit amplification, ADC, and/or readout of data associated with a CMOS-based pixel in an upcoming frame(s) (e.g., a conventional CMOS pixel or a jot pixel).

At 1108, process 1100 can determine whether image data is to be output. In some embodiments, process 1100 can determine whether image data is to be output (e.g., to a processor executing a computer vision task, to a processor generating a digital image for presentation to a user and/or storage, etc.) using any suitable technique or combination of techniques. For example, process 1100 can determine whether a total accumulation time has elapsed (e.g., corresponding to a predetermined number of binary frames, a predetermined sequence of exposure bracket cycles, etc.). Note that in some embodiments, the total accumulation time can be variable (e.g., depending on environmental conditions, such as average flux of the scene) or fixed. As another example, image data can be streamed (e.g., frames can be output substantially continuously).

If process 1100 determines that data is not to be outputted ("NO" at 1108), process 1100 can return to 1102, and can capture one or more additional frames.

Otherwise, if process 1100 determines that data is to be outputted ("YES" at 1108), process 1100 can move to 1110.

At 1110, process 1100 can generate image data based on data in the series of frames and/or can analyze data in the series of frames. In some embodiments, process 1100 can generate image data using any suitable technique or combination of techniques, such as quanta burst photography and/or burst vision (e.g., described below in connection with FIG. 15 and in Appendix A), burst photography for a conventional image sensor (e.g., as described in Hasinoff et al., "Burst photography for high dynamic range and low-light imaging on mobile cameras," ACM Transactions on Graphics (2016)). In some embodiments, data indicating which pixels were inhibited or not inhibited in each frame can be output at 1108 with image data. Additionally or alternatively, in some embodiments, the data from each frame can be used to determine whether a particular frame was inhibited. For example, the inhibition policy or policies can be implemented on the image sensor to set an inhibition pattern during capture of the frames, and can be implemented on a processor (e.g., off the image sensor) used to reconstruct and/or analyze the image data to determine the inhibition pattern that was used during capture of each frame, as the inhibition pattern is deterministic and can be determined if the inhibition policy and value in each frame is known.

In some embodiments, process 1100 can analyze the image data using any suitable technique or combination of techniques, such as edge detection, object detection, semantic segmentation, image classification, object tracking, odometry, optical flow, motion estimation, simultaneous localization and mapping (SLAM), etc. In some embodiments, analysis of the image data can require reconstruction of a digital image (e.g., an 8-bit or higher digital image). Additionally or alternatively, analysis of the image data can be performed on the binary frame data (e.g., without explicit image reconstruction), such as techniques described in U.S. Patent Application Publication No. 2022/0358346 (e.g., using a spiking neural network). Note that a model trained using data generated without a particular inhibition policy may require adjustment, such as fine tuning, additional training (e.g., using one or more transfer learning techniques), re-training, data preprocessing, etc., for particular applications, while in other applications (e.g., detection and classification tasks, low-light scenarios, etc.) such a model may be suitable without adjustments. Note that preprocessing may be required to analyze data using a machine learning model that utilizes higher bit depth data. In such applications, preprocessing can include operations to increase the data bit-depth of the data (e.g., to correspond to a bit depth used to train the model).

Figure 12:
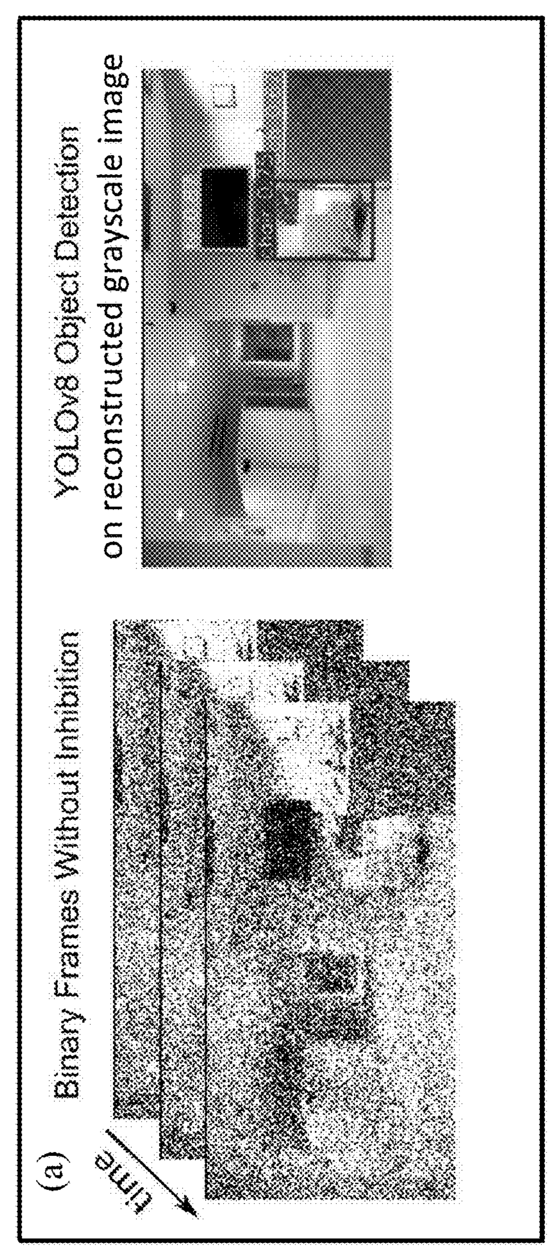
FIG. 12 shows an example of binary frames captured without and with an inhibition policy implemented in accordance with some embodiments of the disclosed subject matter, and object detection results on an image generated from the respective binary frames.
Figure 12:
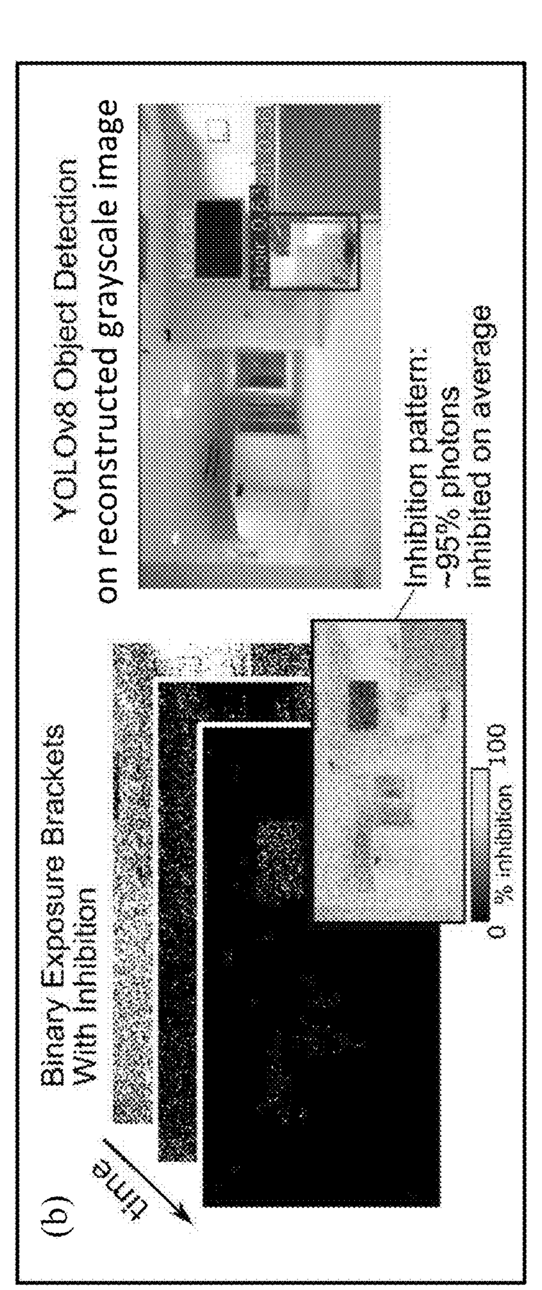

FIG. 12 shows an example of binary frames captured without and with an inhibition policy implemented in accordance with some embodiments of the disclosed subject matter, and object detection results on an image generated from the respective binary frames. The results of FIG. 12 are from binary frame captured with a real-world SPAD camera. Inhibition was emulated in software post-processing.

Figure 13:
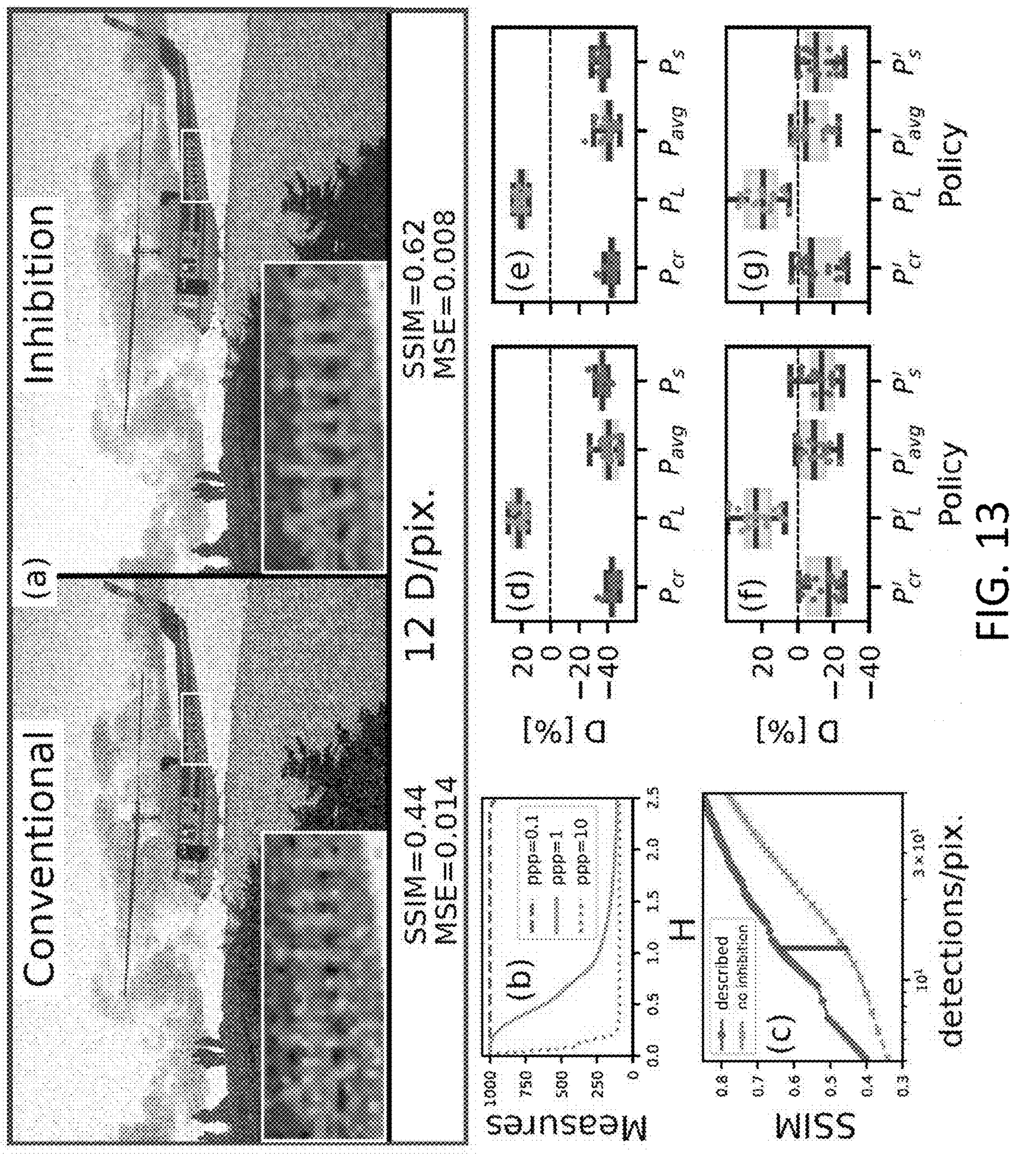
FIG. 13 shows examples of simulated images generated using a conventional clocked recharge policy and using an inhibition policy implemented in in accordance with some embodiments of the disclosed subject matter, and various plots related to performance of inhibition policies implemented in accordance with some embodiments of the disclosed subject matter.

FIG. 13 is based on sequences of binary frames generated from grayscale images generated from a dataset of RGB images converted to grayscale using Monte Carlo simulations, where the '0' or '1' value of each pixel of the simulated binary frame represents whether a photon arrives during that frame. Each simulated SPAD frame was generated by sampling from the Poisson distribution with a mean value determined by the grayscale level at the pixel. Multiple SPAD binary frames were generated by repeating the process. If the pixel was inhibited at a point in time when a photon arrived at the pixel (e.g., based on an inhibition policy), no detection was recorded.

An inhibition score and patterns for various inhibition policies and tuning parameters were calculated from the simulated binary frame sequences. Once inhibition patterns were determined, performance was evaluated by tabulating detections, measurements, and image quality or vision task performance for each step in the sequence.

FIG. 12, panel (a) shows binary frames generated using a clocked recharge with exposure brackets (e.g., as shown in FIG. 7, panel (c)), and FIG. 12, panel (b) shows binary frames generated using an inhibition policy that extends the baseline inhibition generated by clocked recharge with exposure brackets to a saturation look-ahead policy (e.g., as shown in FIG. 7, panel (e)). Note that the sequence of binary frames shown in FIG. 12 are not the individual measured binary frames themselves, but composite binary frames that resulted from "exposing" the simulated SPAD sensor to a sum of measured binary frames that correspond to an exposure time $T_x$, and applying the corresponding inhibition policy. As shown in FIG. 12, object detection on the grayscale image reconstructed from the frames captured with saturation look-ahead was successful, and similar to results of object detection on the grayscale image reconstructed from the frames captured with clocked recharge with exposure brackets, even with a large fraction of photon detections inhibited. Accordingly, mechanisms described herein can be used to generate image data from binary frames that can be used for high level visions tasks with reduced power consumption, especially in brightly lit environments.

FIG. 13 shows examples of simulated images generated using a conventional clocked recharge with exposure brackets policy and using an inhibition policy implemented in accordance with some embodiments of the disclosed subject matter, and various plots related to performance of inhibition policies implemented in in accordance with some embodiments of the disclosed subject matter. In FIG. 13, static images reconstructed from simulated SPAD data are shown, with various metrics indicative of power consumption and/or image quality, demonstrating that mechanisms described herein can be used for power-efficient static imaging via inhibition.

FIG. 13. panel (a) shows an image comparison at an average of 12 detections/pixel for an exposure bracketing sequence (average intensities of 0.1, 1.0, 10.0 photons per pixel (ppp)) using conventional clocked recharge with exposure bracketing and a score-based inhibition policy. FIG. 13 (e.g., as described in section A1.5 of Appendix A), panel (b) shows how inhibition distributes measurements based on pixel intensity. H is the pixel exposure level at the center exposure time, and FIG. 13, panel (c) shows that using the score-based inhibition policy improved image quality (structural similarity index measure (SSIM)) at equal detections/pixel.

FIG. 13, panels (d) to (g) show results of testing of various inhibition policies over 20 images and assessed by reductions in detections (D) at equal SSIM (e.g., (d),(f) at SSIM=0.7 and (e),(g) at SSIM=0.8)). The results in panels (d) and (e) were generated using exposure bracketing and a score-based inhibition policy, and the results in panels (f) and (g) used a single exposure of 1.0 ppp (without bracketing) and a score-based inhibition policy.

The boxes in panels (d) to (g) show the quartiles of the distribution with the center line at the median. The spatial kernel of policy $P_{cr}$, uses a 3×3 spatial kernel that emphasizes the center pixel (×8), and includes the 8 neighbors (×1). The spatial kernels of policies $P_L$, $P_{avg}$, and $P_s$ are a 3×3 Laplacian, 3×3 average, and single pixel, respectively, with separately tuned $\eta$ and $\tau_H$. The spatio-temporal kernels K of policies $$P'_{cr}, P'_L, P'_{avg}, \text{ and } P'_s$$

were the same, with different values of $\eta$ and $\tau_H$. The spatial kernels (3×3) were combined with an averaging temporal kernel of length 4 to generate lightweight inhibition policies that allocated pixel measurements (e.g., as described above in connection with FIG. 7). Additional examples of image and policy details are described in Appendix A.

FIG. 13, panels (d) to (g) summarize simulation results. FIG. 13, panels (d) and (e) show reductions in photon detections at equal SSIM, facilitated by inhibiting bright pixels, for an exposure bracketing sequence using policies $P_{cr}$, $P_L$, $P_{avg}$, and $P_s$. Intensity estimates from each bracket were combined using $SNR^2$ weighting (e.g., as described in Gnanasambandam et al., "HDR Imaging With Quanta Image Sensors: Theoretical Limits and Optimal Reconstruction," IEEE Transactions on Computational Imaging, 6:1571-1585, 2020) and then converted to a binary rate estimate at the center exposure level of 1 ppp. Policy $P_{cr}$ demonstrated an average reduction in detections of 42% as compared to no inhibition. FIG. 13, panels (f) and (g) evaluate a single exposure level (1.0 ppp) which is a more challenging scenario, yet policy $$P'_{cr}$$

still reduces detections by 14% at SSIM=0.7.

Figure 14:
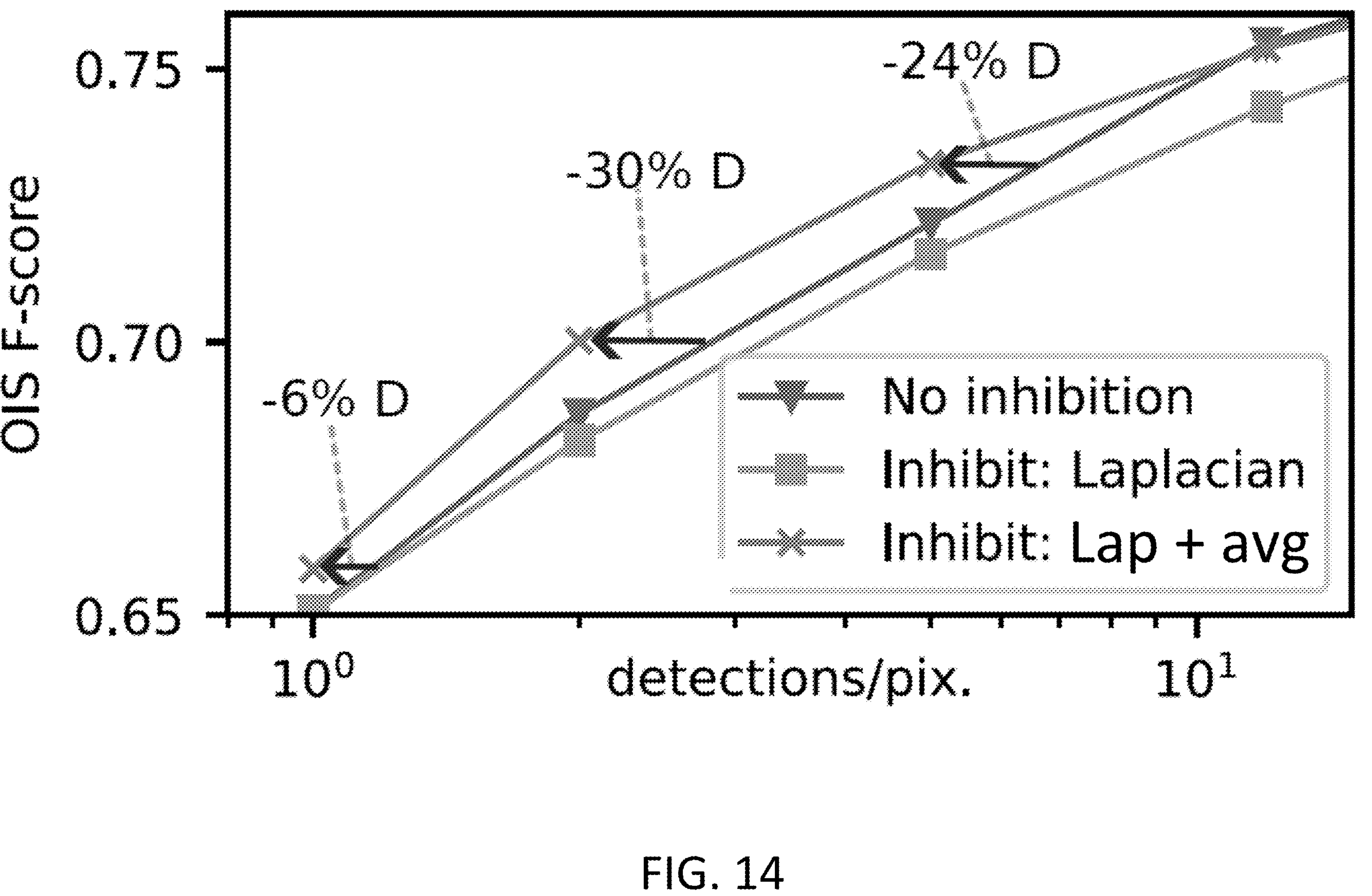
FIG. 14 shows an example of a plot of edge detection performance on images generated using various inhibition policies, including inhibition policies implemented in accordance with some embodiments of the disclosed subject matter.

FIG. 14 shows an example of a plot of edge detection performance on images generated using various inhibition policies, including inhibition policies implemented in accordance with some embodiments of the disclosed subject matter. In the example described in connection with FIG. 14, edge detection was performed on static images reconstructed from simulated SPAD data, with metrics indicative of power consumption and edge detection results, demonstrating that mechanisms described herein can be used for power-efficient edge detection via inhibition. In the graph of FIG. 14 is based on optimal image scale (OIS) edge detection F-scores averaged over 19 images versus the average number of detections per pixel. Illustrated by the horizontal arrows, the reduces the detections needed for equivalent performance. At and beyond 30 D/pixel no inhibition and a policy that combines scores from Laplacian and averaging filter kernels are nearly equivalent and plateau at 200 D/pix. The edge detector returns F=0.813 when evaluated using the original images of the set.

The BSDS500 dataset with ground truth boundaries was used to evaluate energy-efficient edge detection via photon inhibition. Binary rate images were processed by pre-trained holistically-nested edge detection (HED) with resulting edge maps compared to ground truth by the structured edge detection toolbox. FIG. 14 shows the F-score versus the average detections per pixel. Interpolated curves (not shown) allow for translating along horizontal lines of equal task performance to assess differences in avalanche energy. The results include curves for "no inhibition" (a clocked recharge exposure scheme, as described above in connection with FIG. 7(*b*)), "inhibit: Laplacian" (an inhibition policy using policy $P_L$ applied used with a clocked recharge exposure scheme), and "inhibit: Lap+avg". The Lap+avg policy extends an on-sensor calculation approach by calculating two scores, a score $S_1$ based on a 3×3 Laplacian filter using the kernel described in connection with $P_L$, and a score $S_2$ based on a 3×3 averaging filter using the kernel described in connection with $P_{avg}$ (see, e.g., section A2.5 of Appendix A). The final inhibition decision was the Boolean operation of these scores as $((\eta_1<S_1<\eta_2)\wedge(S_2>\eta_3))\vee(S_2>\eta_4)$. At low photon counts the combined policy demonstrated a 30% reduction in detections on single exposure time captures. The Laplacian policy alone performed poorly as dim regions with minimal spatial variation are inhibited, and inhibition of dim pixels is generally energy inefficient. Additional description is included in Appendix A.

Figure 15:
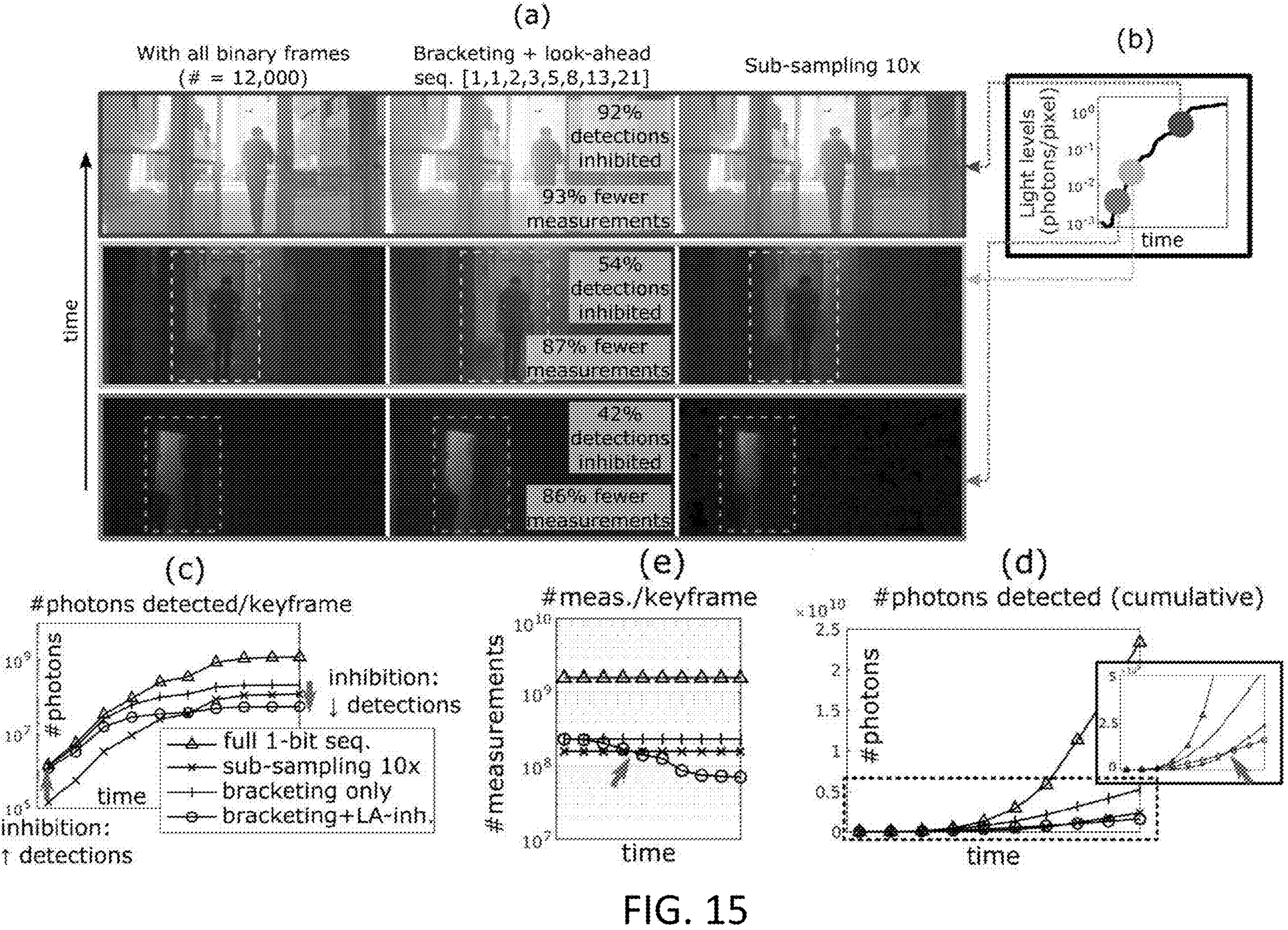
FIG. 15 shows an example of images generated using various inhibition policies, including inhibition policies implemented in accordance with some embodiments of the disclosed subject matter, and various plots related to performance of inhibition policies implemented in accordance with some embodiments of the disclosed subject matter.

FIG. 15 shows an example of images generated using various inhibition policies, including inhibition policies implemented in accordance with some embodiments of the disclosed subject matter, and various plots related to performance of inhibition policies implemented in accordance with some embodiments of the disclosed subject matter. In some embodiments, mechanisms described herein can be used to implement adaptive inhibition policies on video sequences that facilitate stronger inhibition, preserve low-light details and, in bright-light, decouple flux and detection energy.

FIG. 15, panel (a) shows video frame reconstructions for three keyframes with varying light levels. The left column shows burst reconstruction (e.g., as described in Ma et al., "Quanta burst photography," ACM Transactions on Graphics, 39(4):79:179:16, 2020) from the original binary frames without inhibition, and the right column the same frames after sub-sampling 10×(fixed 90% inhibition). The middle column shows results after exposure bracketing combined with a saturation look-ahead (e.g., as described above in connection with FIG. 7, panel (e)). Reasonable results were obtained under strong light (top row) with both the fixed and adaptive inhibition techniques, but plain sub-sampling (in the right column) lost details in low light (e.g., a person's outline in the bottom row, furniture in the middle row). Bracketing+look-ahead inhibition was more adaptive to flux. All image visualizations are in the rate-domain (Y rather than H) and use gamma-compression ($\gamma$=0.4).

FIG. 15, panel (b) shows an increasing trend over time in the overall light level in the ~600 k frame video sequence. The three keyframes in panel (a) span almost two orders of magnitude in illumination change.

FIG. 15, panels (c) and (d) show that measured using per keyframe and cumulative detection counts bracketing+look-ahead inhibition ultimately resulted in fewer photons being detected over the whole sequence.

FIG. 15, panel (e) shows that the number of measurements taken for each keyframe with each policy. Reductions in measurements can be expected to translate to energy savings during sensor read-out. Note that the plots in panels (c) to (e) were sub-sampled for clarity, and crossover points are marked by arrows.

Many real-world scenes contain significant motion even with the high frame rate of a SPAD camera. Burst reconstruction algorithms that yield high-quality images from sequences of binary frames have been described (e.g., in Ma et al., "Quanta burst photography," and Ma et al., "Burst Vision Using Single-Photon Cameras," In Proceedings of the IEEE/CVF Winter Conference on Applications of Computer Vision, pages 5375-5385, 2023). The compatibility of such reconstruction algorithms with inhibited photon detection data was evaluated. In particular, the evaluation focused on the saturation look-ahead policy described in connection with FIG. 7, panel (e), applied independently at every pixel (an example of an adaptive single-pixel temporal policy).

If the inhibition policy does not limit periods of extended dead time, salient information under motion can be lost. In the context of the saturation look-ahead policy, mitigating loss of such motion information can limit the maximal exposure time within the bracketing sequence. It is implicitly assumed that flux is piecewise constant in each bracket, and limiting the total length of the sequence to be relatively short can mitigate noise that may be included in a longer sequence. In the experiments described in connection with FIG. 15, a Fibonacci bracketing sequence T:={1,1,2,3,5,8, 13,21} was used, denoted in the units of a single binary frame's exposure time. Another sequence, T':={1,1,1,3,3,3, 8,8,25} yielded similar results. Examples of thresholds used with both bracketing sequences are described in section A2.4 of Appendix A.

After bracketing, every sequence of sum (T)=54 binary measurements at the original rate was replaced with a binary sequence $B_T$ of length count (T)=8. Per-pixel measurements were tracked through a binary-valued vector $M_T$ of equal length, denoting whether the pixel was enabled. Photon inhibitions due to both the expanded exposure time and the look-ahead policy were also tracked. A maximum-likelihood estimate (MLE) of the flux within the exposure bracket was made numerically, taking as input the triplet (T, $B_T$, $M_T$), where T is the exposure time. Additional details are described in Appendix A. Once the flux was estimated for each bracket, the data were compatible with burst reconstruction algorithms. The data was converted to rate-domain using EQ. (1), and quanta burst photography techniques (e.g., described in Ma et al., "Quanta burst photography") with modified parameters to reflect the effective frame rate and noise level was used to reconstruct video frames.

Experiments were performed using mechanisms described herein and binary frame data captured using a SPAD sensor pixel array configured to generate binary frames at a rate up to 97,700 FPS, with a resolution of 512×256 (a prototype sensor, referred to as SwissSPAD2, see, e.g., Ulku et al., "A 512×512 SPAD Image Sensor With Integrated Gating for Widefield FLIM," IEEE Journal of Selected Topics in Quantum Electronics, 25(1):1-12, 2019). In the experiments, binary frames captured directly (without inhibition) by the SPAD array were used as reference data, and on-sensor inhibition was emulated (through saturation look-ahead with exposure brackets) in software. Before subsequent inhibition processing, hot pixels were removed and interpolated via nearest neighbor interpolation.

FIG. 15, panel (a), shows results of burst reconstruction under three lighting conditions, and with various inhibition schemes. The raw data is a sequence of >580,000 binary frames with scene radiance increasing rapidly by orders of magnitude (see FIG. 15, panel (b)), from <1 lux to >4,000 lux, measured separately with a light meter. For each of 47 equally-spaced keyframes, centered windows of 12,000 binary frames were extracted and processed. Results for the full sequence are described in Appendix A. A static inhibition policy of regular sub-sampling (dropping 9 out of every 10 frames) was also applied (see FIG. 15, panel (a), right column), which yielded a fixed 90% reduction in both measurements and photon detections under all lighting conditions. A factor of 10×sub-sampling can balance strong inhibition with image quality (this trade-off is described further in Appendix A).

The top row in FIG. 15, panel (a) shows that under strong light a large fraction of photons (>90%) can be inhibited through a saturation look-ahead inhibition policy and still result in good image quality after burst reconstruction (see FIG. 15, panel (a), center column), thus spreading photon detections over a longer period of time to reduce avalanche power. Note that a static sub-sampling inhibition policy can yield good results in bright light, and may work well under controlled illumination conditions. However, the images in the middle and bottom rows of FIG. 15, panel (a) illustrate that this static inhibition policy results in excessive signal loss in lower light leading to a loss of details. Sub-sampling may be enhanced by adjusting exposure time and/or the sub-sampling factor in response to global flux, but cannot simultaneously optimize for different light levels in a single frame. For example, over-exposed regions may have clipping artifacts and under-exposed regions are prone to motion blur from incorrect burst reconstruction. Of the three inhibition policies shown in FIG. 15, only the dynamic look-ahead policy adapted to local flux to allocate relatively more detections to dim regions (see, e.g., FIG. 12, panel (b)). As described herein, avalanche power is driven by bright light, and therefore, adaptive inhibition policies can adaptively balance power conservation and image quality in scenes with dynamic lighting conditions (e.g., lighting that varies spatially and/or temporally). For example, a saturation look-ahead inhibition policy can decouple detection energy from flux (see, e.g., FIG. 15, panels (c) to (e), and compare with power consumption by a conventional SPAD as flux increases in FIG. 1). Being more aggressive in strong light, saturation look-ahead inhibition policy can ultimately result in cumulatively fewer photon detections than sub-sampling (see, FIG. 15, panel (d)).

Further Examples Having a Variety of Features

Implementation examples are described in the following numbered clauses:

1. A method for generating digital image data with improved energy efficiency, comprising: generating, during a first period of time using an image sensor, first image data representing a scene, wherein the image sensor comprises a plurality of pixels arranged in an array, each of the plurality of pixels comprises a detector of a plurality of detectors, and each of the plurality of detectors is configured to generate a signal based on arrival of one or more photons during an exposure time, wherein the first image data comprises a first plurality of pixel values, each of the first plurality of pixel values associated with a pixel of the plurality of pixels, and wherein each pixel value of the first plurality of pixel values is based on a signal generated by the respective detector associated with the pixel during the first period of time; determining, for each pixel, an inhibition value based on at least the pixel value associated with the pixel; determining, for a first pixel of the plurality of pixels based on the inhibition value associated with the first pixel, that the first pixel is to be inhibited during a second period of time; determining, for a second pixel of the plurality of pixels based on the inhibition value associated with the second pixel, that the second pixel is to be enabled during the second period of time; inhibiting the first pixel during the second period of time; and causing the image sensor to generate, during the second period of time, second image data representing the scene, wherein the second image data comprises a second plurality of pixel values, each of the second plurality of pixel values corresponds to a pixel of the plurality of pixels, and wherein the second plurality of pixel values includes: a pixel value associated with the first pixel that is consistent with the first pixel being inhibited during the second period of time; and a pixel value associated with the second pixel that is based on a signal generated by the detector associated with the first pixel during the second period of time.
2. The method of clause 1, further comprising: generating a digital image based on the first image data and the second image data.
3. The method of any one of clauses 1 or 2, further comprising: performing a computer vision task using the first image data and the second image data.
4. The method of any one of clauses 1 to 3, wherein each of the plurality of detectors comprises a single photon avalanche diode (SPAD), the signal is indicative of whether the SPAD detected a photon during the exposure time, and the pixel value is a binary value that is a binary 1 when the signal indicates that the SPAD detected a photon during the exposure time, and 0 otherwise.
5. The method of clause 4, wherein the first image data comprises a first binary frame, the second image data comprises a second binary frame, and the value associated with the first pixel in the second frame is zero regardless of whether any photons arrived at the first pixel during the second period of time.
6. The method of any one of clauses 4 or 5, further comprising: inhibiting the SPAD of the first pixel from detecting arrival of photons during the second period of time.
7. The method of any one of clauses 4 to 6, wherein the image sensor comprises: the plurality of detectors; and at least one of the one or more processors.
8. The method of any one of clauses 1 to 7, wherein the first period of time includes multiple exposures of a first exposure time $T_x$ which is a first multiple of a time T, and the second period of time corresponds to an exposure of a second exposure time $T_{x+1}$ that is a second multiple of the time T and $T_{x+1}>T_x$.
9. The method of clause 8, further comprising: causing the image sensor to generate a sequence of frames based on a predetermined sequence of exposure bracket cycles, wherein each of exposure bracket cycles generates at least one frame of the sequence of frames with an exposure time that is a multiple of the time T, wherein the first period of time corresponds to a first exposure bracket cycle, and the second period of time corresponds a second exposure bracket cycle that occurs later in the sequence of exposure bracket cycles than the first exposure bracket cycle; determining the inhibition value for the first pixel based on multiple pixel values associated with the first pixel during the first exposure bracket cycle; determining that the first pixel is to be inhibited during the second period of time based on the inhibition value for the first pixel exceeding a threshold $D_{xM}$ associated with the first exposure bracket cycle; determining the inhibition value for the second pixel based on multiple pixel values associated with the second pixel during the first exposure bracket cycle; and determining that the second pixel is to be enabled during the second period of time based on the inhibition value for the second pixel not exceeding the threshold $D_{xM}$.

10. The method of any one of clauses 1 to 7, wherein the first period of time corresponds to a single exposure of exposure time T, and the second period of time corresponds to another single exposure of exposure time T.

11. The method of clause 10, further comprising: in response to determining that the first pixel is to be inhibited during the second period of time, causing the first pixel to be inhibited for a deadtime $\tau_H$ that begins at an end of the first period of time, wherein $\tau_H \geq 2T$.

12. The method of any one of clauses 1 to 11, wherein an inhibition value for the first pixel comprises a score, and wherein the score is based on a first pixel value in the first image data associated with the first pixel, and a plurality of pixel values associated with neighboring pixels of the first pixel.

13. The method of clause 12, wherein the first pixel has a location (i,j) in the array, the first image data represents the scene at a time t, and the first period of time includes time t, and wherein the method further comprises: determining the score based on the following relationship: $S(i,j,t)=K*[(2F(i,j,t)-1)\cdot M(i,j,t)]$, where S(i,j,t) is the score, K is a spatio-temporal kernel separable into a spatial component $K_s$ and a temporal component separated into spatial and temporal components as $K_t$ with dimensions W×H×1 and 1×1×L, respectively, and $K=K_s \otimes K_t$, F(i,j,t) is a tensor with dimensions W×H×L that includes image data generated by a group of W×H neighboring pixels including the first pixel for each of L most recent exposures, and M(i,j,t) is a tensor with dimensions W×H×L that includes an indication of whether each pixel in the group of W×H neighboring pixels was inhibited during each of the L most recent exposures; determining that the score exceeds a threshold $\eta$; and in response to determining that the score exceeds the threshold $\eta$, determining that the first pixel is to be inhibited during the second period of time.

14. The method of clause 13, wherein values of K and $\eta$ are associated with a particular computer vision task, and the values of K and $\eta$ were set as a result of an automated training process that determined the values based on results generated from performing the particular computer vision task on training data using the inhibition policy and a plurality of different combinations of values for K and $\eta$, where final values of K and $\eta$ are associated with improved performance of the computer vision task.

15. The method of any one of clauses 1 to 3, wherein each of the plurality of detectors comprises a photodiode included in a complementary metal-oxide semiconductor (CMOS) pixel, the signal is indicative of a brightness of a portion of the scene corresponding to the pixel, and the pixel value is a multi-bit digital value indicative of the brightness of the portion of the scene corresponding to the pixel.

16. A system comprising: one or more processors configured to: perform a method of any one of clauses 1 to 15.

17. A non-transitory computer-readable medium storing computer-executable code, comprising code for causing a computer to cause a processor to: perform a method of any of one of clauses 1 to 15.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof It should be understood that above-described steps of the processes of FIGS. 9 to 11 can be executed or performed in any suitable order or sequence not limited to the order and sequence shown and described in the figures. Also, some of the above steps of the processes of FIGS. 9 to 11 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for generating digital image data with improved energy efficiency, comprising:

an image sensor comprising a plurality of pixels arranged in an array, wherein each of the plurality of pixels comprises a detector of a plurality of detectors, and wherein each of the plurality of detectors is configured to generate a signal based on arrival of one or more photons during an exposure time;

wherein the image sensor is configured to:

generate, during a first period of time, first image data representing a scene, wherein the first image data comprises a first plurality of pixel values, each of the first plurality of pixel values associated with a pixel of the plurality of pixels, and wherein each pixel value of the first plurality of pixel values is based on a signal generated by the respective detector associated with the pixel during the first period of time;

one or more processors configured to:

determine, for each pixel, a local inhibition value based on at least the pixel value associated with the pixel;

determine, for a first pixel of the plurality of pixels based on a first local inhibition value associated with the first pixel, that the first pixel is to be inhibited during a second period of time;

determine, for a second pixel of the plurality of pixels based on a second local inhibition value associated with the second pixel, that the second pixel is to be enabled during the second period of time;

inhibit the first pixel during the second period of time; and cause the image sensor to generate, during the second period of time, second image data representing the scene, wherein the second image data comprises a second plurality of pixel values, each of the second plurality of pixel values corresponds to a pixel of the plurality of pixels, and wherein the second plurality of pixel values includes:

a pixel value associated with the first pixel that is consistent with the first pixel being inhibited during the second period of time; and a pixel value associated with the second pixel that is based on a signal generated by the detector associated with the first pixel during the second period of time.

2. The system of claim 1, wherein the one or more processors are further configured to:

generate a digital image based on the first image data and the second image data.

3. The system of claim 1, wherein the one or more processors are further configured to:

perform a computer vision task using the first image data and the second image data.

4. The system of claim 1, wherein each of the plurality of detectors comprises a single photon avalanche diode (SPAD), the signal is indicative of whether the SPAD detected a photon during the exposure time, and the pixel value is a binary value that is a binary 1 when the signal indicates that the SPAD detected a photon during the exposure time, and 0 otherwise.

5. The system of claim 4, wherein the first image data comprises a first binary frame, the second image data comprises a second binary frame, and the value associated with the first pixel in the second frame is zero regardless of whether any photons arrived at the first pixel during the second period of time.

6. The system of claim 4, wherein the one or more processors are further configured to:

inhibit the SPAD of the first pixel from detecting arrival of photons during the second period of time.

7. The system of claim 4, wherein the image sensor comprises:

the plurality of detectors; and at least one of the one or more processors.

8. The system of claim 1, wherein the first period of time includes multiple exposures of a first exposure time $T_x$ which is a first multiple of a time T, and the second period of time corresponds to an exposure of a second exposure time $T_{x+1}$ that is a second multiple of the time T and $T_{x+1}>T_x$.

9. The system of claim 8, wherein the one or more processors are further configured to:

cause the image sensor to generate a sequence of frames based on a predetermined sequence of exposure bracket cycles, wherein each of exposure bracket cycles generates at least one frame of the sequence of frames with an exposure time that is a multiple of the time T, wherein the first period of time corresponds to a first exposure bracket cycle, and the second period of time corresponds a second exposure bracket cycle that occurs later in the sequence of exposure bracket cycles than the first exposure bracket cycle;

determine the first local inhibition value for the first pixel based on multiple pixel values associated with the first pixel during the first exposure bracket cycle;

determine that the first pixel is to be inhibited during the second period of time based on the first local inhibition value exceeding a threshold $D_{xM}$ associated with the first exposure bracket cycle;

determine the second local inhibition value for the second pixel based on multiple pixel values associated with the second pixel during the first exposure bracket cycle; and determine that the second pixel is to be enabled during the second period of time based on the second local inhibition value not exceeding the threshold $D_{xM}$.

10. The system of claim 1, wherein the first period of time corresponds to a single exposure of exposure time T, and the second period of time corresponds to another single exposure of exposure time T.

11. The system of claim 10, wherein the one or more processors are further configured to:

in response to determining that the first pixel is to be inhibited during the second period of time, cause the first pixel to be inhibited for a deadtime TH that begins at an end of the first period of time, $$\text{wherein } \tau_H \geq 2T.$$

12. The system of claim 1, wherein the first local inhibition value comprises a score, and wherein the score is based on a first pixel value in the first image data associated with the first pixel, and a plurality of pixel values associated with neighboring pixels of the first pixel.

13. The system of claim 12, wherein the first pixel has a location (i,j) in the array, the first image data represents the scene at a time t, and the first period of time includes time t, and wherein the one or more processors are further configured to:

determine the score based on the following relationship:

$$S(i,j,t) = K * [(2F(i,j,t) - 1) \cdot M(i,j,t)],$$

where

S(i,j,t) is the score,

K is a spatio-temporal kernel separable into a spatial component $K_s$ and a temporal component separated into spatial and temporal components as $K_t$ with dimensions W×H×1 and 1×1×L, respectively, and $K=K_s \otimes K_t$, F(i,j,t) is a tensor with dimensions W×H×L that includes image data generated by a group of W×H neighboring pixels including the first pixel for each of L most recent exposures, and M(i,j,t) is a tensor with dimensions W×H×L that includes an indication of whether each pixel in the group of W×H neighboring pixels was inhibited during each of the L most recent exposures;

determine that the score exceeds a threshold n; and in response to determining that the score exceeds the threshold n, determine that the first pixel is to be inhibited during the second period of time.

14. The system of claim 13, wherein values of K and η are associated with a particular computer vision task, and the values of K and η were set as a result of an automated training process that determined the values based on results generated from performing the particular computer vision task on training data using an inhibition policy and a plurality of different combinations of values for K and η, where final values of K and η are associated with improved performance of the computer vision task.

15. The system of claim 1, wherein each of the plurality of detectors comprises a photodiode included in a complementary metal-oxide semiconductor (CMOS) pixel, the signal is indicative of a brightness of a portion of the scene corresponding to the pixel, and the pixel value is a multi-bit digital value indicative of the brightness of the portion of the scene corresponding to the pixel.

16. A method for generating digital image data with improved energy efficiency, comprising:

generating, during a first period of time using an image sensor, first image data representing a scene, wherein the image sensor comprises a plurality of pixels arranged in an array, each of the plurality of pixels comprises a detector of a plurality of detectors, and each of the plurality of detectors is configured to generate a signal based on arrival of one or more photons during an exposure time, wherein the first image data comprises a first plurality of pixel values, each of the first plurality of pixel values associated with a pixel of the plurality of pixels, and wherein each pixel value of the first plurality of pixel values is based on a signal generated by the respective detector associated with the pixel during the first period of time;

determining, for each pixel, a local inhibition value based on at least the pixel value associated with the pixel;

determining, for a first pixel of the plurality of pixels based on a first local inhibition value associated with the first pixel, that the first pixel is to be inhibited during a second period of time;

determining, for a second pixel of the plurality of pixels based on a second local inhibition value associated with the second pixel, that the second pixel is to be enabled during the second period of time;

inhibiting the first pixel during the second period of time; and causing the image sensor to generate, during the second period of time, second image data representing the scene, wherein the second image data comprises a second plurality of pixel values, each of the second plurality of pixel values corresponds to a pixel of the plurality of pixels, and wherein the second plurality of pixel values includes:

a pixel value associated with the first pixel that is consistent with the first pixel being inhibited during the second period of time; and a pixel value associated with the second pixel that is based on a signal generated by the detector associated with the first pixel during the second period of time.

17. The method of claim 16, further comprising:

generating a digital image based on the first image data and the second image data.

18. The method of claim 16, further comprising:

performing a computer vision task using the first image data and the second image data.

19. The method of claim 16, wherein each of the plurality of detectors comprises a single photon avalanche diode (SPAD), the signal is indicative of whether the SPAD detected a photon during the exposure time, and the pixel value is a binary value that is a binary 1 when the signal indicates that the SPAD detected a photon during the exposure time, and 0 otherwise.

20. A non-transitory computer readable medium containing computer executable instructions that, when executed by a processor, cause the processor to perform a method for generating digital image data with improved energy efficiency, the method comprising:

generating, during a first period of time using an image sensor, first image data representing a scene, wherein the image sensor comprises a plurality of pixels arranged in an array, each of the plurality of pixels comprises a detector of a plurality of detectors, and each of the plurality of detectors is configured to generate a signal based on arrival of one or more photons during an exposure time, wherein the first image data comprises a first plurality of pixel values, each of the first plurality of pixel values associated with a pixel of the plurality of pixels, and wherein each pixel value of the first plurality of pixel values is based on a signal generated by the respective detector associated with the pixel during the first period of time;

determining, for each pixel, an the first local inhibition value based on at least the pixel value associated with the pixel;

determining, for a first pixel of the plurality of pixels based on the first local inhibition value, that the first pixel is to be inhibited during a second period of time;

determining, for a second pixel of the plurality of pixels based on the second local inhibition value, that the second pixel is to be enabled during the second period of time;

inhibiting the first pixel during the second period of time; and causing the image sensor to generate, during the second period of time, second image data representing the scene, wherein the second image data comprises a second plurality of pixel values, each of the second plurality of pixel values corresponds to a pixel of the plurality of pixels, and wherein the second plurality of pixel values includes:

a pixel value associated with the first pixel that is consistent with the first pixel being inhibited during the second period of time; and a pixel value associated with the second pixel that is based on a signal generated by the detector associated with the first pixel during the second period of time.

* * * * *